US007663874B2

(12) United States Patent  
Hattori et al.

(10) Patent No.: US 7,663,874 B2  
(45) Date of Patent: Feb. 16, 2010

(54) ELECTRONIC APPARATUS

(75) Inventors: Masahiko Hattori, Kawasaki (JP);
Masahiko Kyouzuka, Kawasaki (JP);
Asao Shimazaki, Kawasaki (JP);
Daisuke Yamagishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/230,941

(22) Filed: Sep. 8, 2008

(65) Prior Publication Data

US 2009/0009950 A1    Jan. 8, 2009

(51) Int. Cl.
*G06F 1/16* (2006.01)

(52) U.S. Cl. .................. 361/679.4; 345/653; 73/781; 340/870.11

(58) Field of Classification Search ............ 361/679.4, 361/679.26, 679.27, 679.28; 345/157, 184, 345/163, 653; 73/781; 455/1, 507; 340/870.02, 340/870.11
See application file for complete search history.

(56) References Cited

U.S. PATENT DOCUMENTS

| | | | |
|---|---|---|---|
| 5,335,142 A * | 8/1994 | Anderson | 361/679.07 |
| 6,742,221 B2 * | 6/2004 | Lu et al. | 16/367 |
| 6,813,146 B2 | 11/2004 | Haraguchi et al. | |
| 6,883,206 B2 * | 4/2005 | Yang et al. | 16/337 |
| 6,912,122 B2 * | 6/2005 | Chen et al. | 361/679.27 |
| 7,277,086 B2 * | 10/2007 | Sugihara | 345/169 |
| 7,345,871 B2 * | 3/2008 | Lev et al. | 361/679.27 |
| 2004/0027793 A1 | 2/2004 | Haraguchi et al. | |
| 2004/0141284 A1 * | 7/2004 | Chen et al. | 361/681 |
| 2005/0207104 A1 * | 9/2005 | Love | 361/683 |
| 2006/0044743 A1 * | 3/2006 | Ito et al. | 361/681 |

FOREIGN PATENT DOCUMENTS

| | | |
|---|---|---|
| JP | 4-116716 | 4/1992 |
| JP | 5-79623 | 10/1993 |
| JP | 2001-268613 | 9/2001 |
| JP | 2002-141984 | 5/2002 |
| JP | 2004-328198 | 11/2004 |
| JP | 2005-109626 | 4/2005 |

OTHER PUBLICATIONS

International Search Report mailed on Apr. 18, 2006 and issued in corresponding International Patent Application No. PCT/JP2006/304494.

International Preliminary Report on Patentability mailed on Sep. 18, 2008 and issued in corresponding International Patent Application No. PCT/JP2006/304494.

* cited by examiner

*Primary Examiner*—Hung V Duong
(74) *Attorney, Agent, or Firm*—Staas & Halsey LLP

(57) ABSTRACT

A second enclosure is coupled to a first enclosure for relative rotation around a rotation axis. The second enclosure rotates around the rotation axis in the opposite directions from a reference attitude. The second enclosure is prevented from further rotating in the first direction beyond the first rotation angle from the reference attitude. The second enclosure takes the first angular attitude. The second enclosure is also prevented from further rotating in the second direction opposite to the first direction beyond the second rotation angle from the reference attitude. The second enclosure takes the second angular attitude. The displaying unit indicates either of the first and second directions at least when the second enclosure takes the first angular attitude. The displaying unit in this manner enables the user to easily recognize an acceptable direction for the rotation of the second enclosure.

8 Claims, 18 Drawing Sheets

ELECTRONIC APPARATUS

BACKGROUND OF THE INVENTION

1. Field of the Invention

The present invention relates to an electronic apparatus including: a first enclosure; and a second enclosure coupled to the first enclosure for relative rotation around a rotation axis intersecting with the surface of the first enclosure.

2. Description of the Prior Art

A notebook personal computer has a display enclosure coupled to a main enclosure for relative rotation around a perpendicular axis normal to the surface of the main enclosure, for example. When the display enclosure rotates from a reference attitude around the perpendicular axis in the clockwise direction by the rotation angle of 180 degrees, the display enclosure is completely reversed. The display enclosure is prevented from rotating further from the rotation angle of 180 degrees in the clockwise direction. A swivel mechanism, utilized to couple the display enclosure to the main enclosure, has a function to prevent such a further rotation.

When the display enclosure has completely been reversed, the user cannot recognize the direction for returning the display enclosure to the reference attitude around the perpendicular axis. In the case where the user further rotates the display enclosure in the clockwise direction, the swivel mechanism suffers from a large load. The swivel mechanism may be damaged. In particular, in the case where the display enclosure is allowed to rotate not only over the rotation angle of 180 degrees in the clockwise direction but also over the rotation angle of 180 degrees in the anticlockwise direction, the swivel mechanism may possibly suffer from a large load more often.

SUMMARY OF THE INVENTION

It is accordingly an object of the present invention to provide an electronic apparatus enabling users to recognize an acceptable direction for the rotation of an enclosure.

According to the present invention, there is provided an electronic apparatus comprising: a first enclosure; a second enclosure coupled to the first enclosure for relative rotation around a rotation axis intersecting with the surface of the first enclosure, the second enclosure rotating around the rotation axis in a first direction and a second direction, opposite to the first direction, from a reference attitude; a rotation restriction mechanism designed to terminate the rotation of the second enclosure in the first direction from the reference attitude at a first rotation angle from the reference attitude, thereby establishing a first attitude of the second enclosure, the rotation restriction mechanism being designed to terminate the rotation of the second enclosure in the second direction from the reference attitude at a second rotation angle from the reference attitude, thereby establishing a second attitude of the second enclosure; and a displaying unit designed to indicate one of the first direction and the second direction at least when the second enclosure takes the first attitude.

The second enclosure is prevented from further rotating in the first direction beyond the first rotation angle from the reference attitude. The second enclosure thus takes the first attitude. Likewise, the second enclosure is also prevented from further rotating in the second direction opposite to the first direction beyond the second rotation angle from the reference attitude. The second enclosure thus takes the second attitude. The displaying unit indicates either of the first and second directions at least when the second enclosure takes the first attitude. The displaying unit in this manner enables the user to easily recognize an acceptable direction for the rotation of the second enclosure so that the second enclosure returns to the reference attitude. This results in a reliable prevention of destruction of the rotation restriction mechanism.

The displaying unit may indicate the other of the first direction and the second direction when the second enclosure takes the second attitude. The user is thus allowed to easily recognize an acceptable direction for the rotation of the second enclosure so that the second enclosure returns to the reference attitude from the second attitude. This results in a reliable prevention of destruction of the rotation restriction mechanism. The second enclosure may be coupled to the first enclosure for relative rotation around a horizontal axis set parallel to the surface of the first enclosure.

The first rotation angle may be set equal to the second rotation angle in the electronic apparatus. When the first rotation angle and the second rotation angle are set at 180 degrees, for example, it is impossible to distinguish the first attitude of the second enclosure from the second attitude of the second enclosure based on the appearance of the second enclosure. Even in such a case, the displaying unit enables the user to recognize an acceptable direction for the rotation of the second enclosure. This results in a reliable prevention of destruction of the rotation restriction mechanism.

The electronic apparatus may further comprise: an operating element rotating around the rotation axis along with the second enclosure; and a sensor detecting contact of the operating element. The operating element moves around the rotation axis in response to the rotation of the second enclosure. The sensor detects contact of the operating element during the rotation of the operating element. The sensor thus detects the direction of the movement of the operating element, namely the direction of the rotation of the second enclosure. The detected direction may be utilized to indicate the direction at the displaying unit.

The sensor may detect the contact of the operating element over a range of a predetermined angle from the first rotation angle. The sensor is allowed to detect the contact of the operating element over the range of the predetermined angle. The displaying unit enables indication of the direction over the range of the predetermined angle from the first rotation angle. Specifically, the displaying unit is designed to indicate the direction of the rotation of the second enclosure only over the predetermined angle in a range between the reference attitude and the first attitude.

Alternatively, the electronic apparatus may further comprise: a magnet rotating around the rotation axis along with the second enclosure; and first and second magnetic sensors incorporated in the first enclosure, the first and second magnetic sensors arranged along a movement path of the magnet at a predetermined interval. The magnet moves around the rotation axis in response to the rotation of the second enclosure. The first and second magnetic sensors are arranged along the movement path of the magnet. When the second enclosure rotates in the first direction, the first magnetic sensor is allowed to detect a magnetic field from the magnet earlier than the second magnetic sensor. On the other hand, when the second enclosure rotates in the second direction, the second magnetic sensor is allowed to detect a magnetic field from the magnet earlier than the first magnetic sensor. The direction of the rotation of the second enclosure is in this manner detected. The detected direction of the rotation may be utilized to indicate the direction at the displaying unit.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
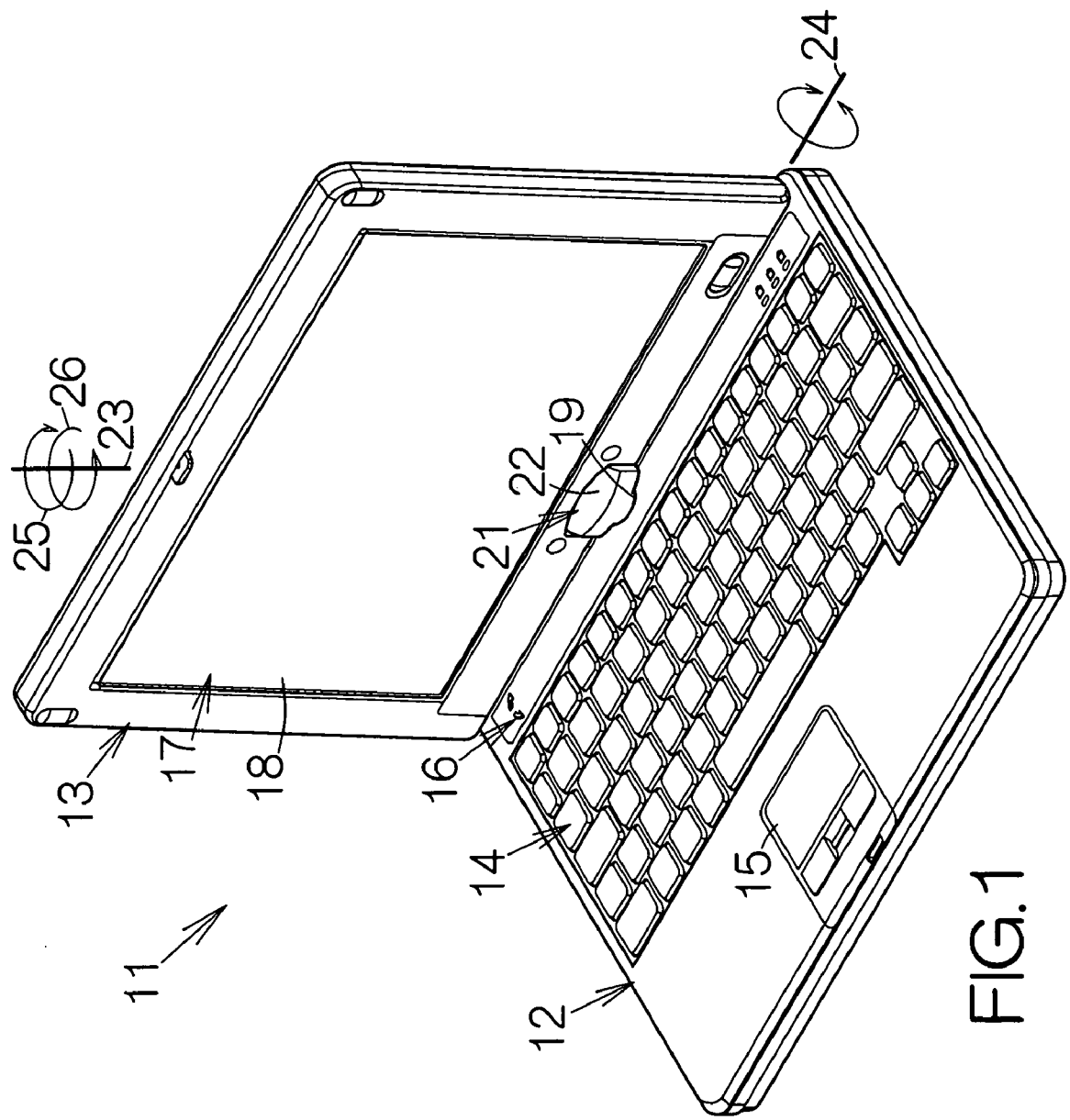
FIG. 1 is a perspective view schematically illustrating a notebook personal computer as an example of an electronic apparatus according to an embodiment of the present invention.

FIG. 1 schematically illustrates a notebook personal computer 11 as a specific example of an electronic apparatus according to the present invention. The notebook personal computer 11 includes a first enclosure, namely a main enclosure 12. The notebook personal computer 11 further includes a second enclosure, namely a display enclosure 13, coupled to the main enclosure 12. The main enclosure 12 and the display enclosure 13 may be made of a reinforced resin material such as polycarbonate, for example.

A motherboard is enclosed in the main enclosure 12, for example. The motherboard includes electronic circuit elements such as a central processing unit (CPU) and a memory mounted on a printed wiring board, for example. The CPU executes various kinds of processing based on software programs and/or data temporarily held in the memory, for example. The software programs and/or data may be stored in a mass storage such as a hard disk drive (HDD) likewise enclosed in the main enclosure 12.

Input devices such as a keyboard 14 and a pointing device 15 are embedded in the front surface of the main enclosure 12. The keyboard 14 has keypads arranged along an imaginary plane. Users manipulate the keyboard 14 and/or the pointing device 15 to input commands and/or data to the CPU.

A displaying unit 16 is located on the front surface of the main enclosure 12. The displaying unit 16 may be located outside the keyboard 14 at a position adjacent to the rear edge of the main enclosure 12, for example. The displaying unit 16 includes an LED (light-emitting diode) incorporated in the main enclosure 12. Emission of the LED is utilized to display a predetermined kind of information. A detailed description will be made on the displaying unit 16 later.

A flat display panel such as a liquid crystal display (LCD) panel 17 is enclosed in the display enclosure 13, for example. The screen of the LCD panel 17 is exposed on the front surface of the display enclosure 13. Various kinds of text data and graphics appear on the screen in response to the processing of the CPU.

An input device such as a touch screen panel 18 is located on the surface of the LCD panel 17. Various kinds of commands and/or data can be input to the CPU from the touch screen panel 18 in response to the touch of a stylus pen or a finger of the user, for example.

The main enclosure 12 and the display enclosure 13 are coupled to each other through a bi-axial swivel mechanism 21 (hereinafter referred to as "swivel mechanism"). The swivel mechanism 21 partially protrudes from an opening 19 defined in the front surface of the main enclosure 12. The swivel mechanism 21 is covered with a hinge cap 22. The hinge cap 22 protrudes from the opening 19.

The swivel mechanism 21 allows relative rotation between the main enclosure 12 and the display enclosure 13 not only around a rotation axis 23 but also around a horizontal axis 24. The rotation axis 23 intersects with the front surface of the main enclosure 12. Here, the rotation axis 23 perpendicularly intersects with an imaginary plane defined along the front surface of the main enclosure 12. The horizontal axis 24 extends along a plane perpendicular to the rotation axis 23.

Here, the horizontal axis 24 is set to extend in parallel with the front surface of the main enclosure 12.

The swivel mechanism 21 allows the display enclosure 13 to rotate around the rotation axis 23 not only in the clockwise direction, namely a first direction 25, and in the anticlockwise direction, namely a second direction 26. The display enclosure 13 is prevented further rotating in the first direction 25 beyond a range of 180 degrees from a reference attitude. Likewise, the display enclosure 13 is prevented from further rotating in the second direction 26 beyond a range of 180 degrees from the reference attitude.

Now, assume that the front surface of the display enclosure 13 is received on the front surface of the main enclosure 12 through the relative rotation around the horizontal axis 24. As shown in FIG. 1, the display enclosure 13 takes a reference attitude around the rotation axis 23. When the display enclosure 13 takes the reference attitude, the horizontal axis 24 is set in parallel with the rear edge of the main enclosure 24, for example.

Figure 2:
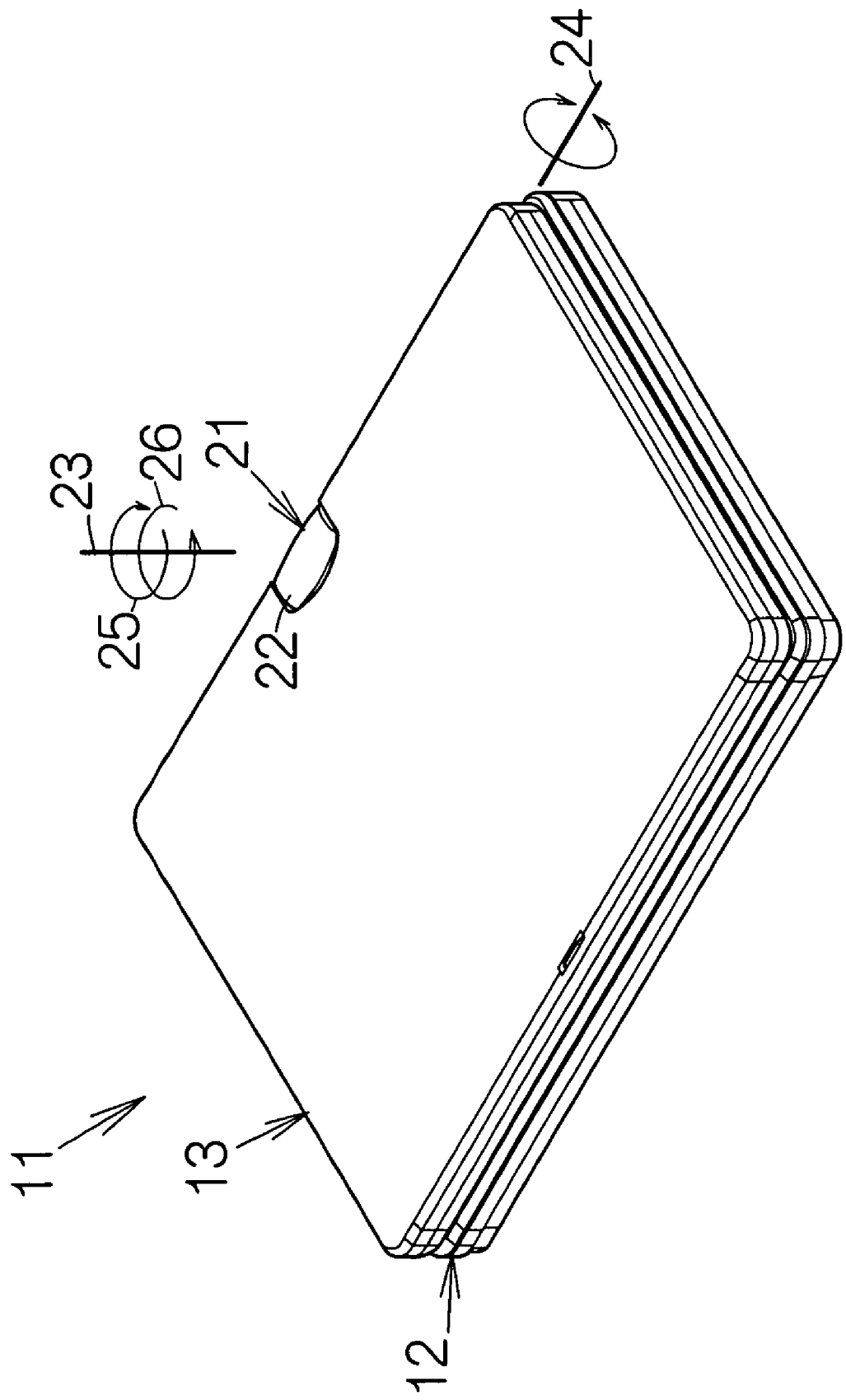
FIG. 2 is a perspective view schematically illustrating the notebook personal computer with the front surface of a display enclosure superposed on the front surface of a main enclosure.

As shown in FIG. 2, when the display enclosure 13 takes the reference attitude around the rotation axis 23, the display enclosure 13 is allowed to rotate around the horizontal axis 24, so that the display enclosure 13 is superposed on the main enclosure 12. The front surface of the display enclosure 13 is opposed to the front surface of the main enclosure 12. The contour of the display enclosure 13 is superposed on the contour of the main enclosure 12. The display enclosure 13 in this manner takes a first closed attitude. The notebook personal computer 11 is folded.

Figure 3:
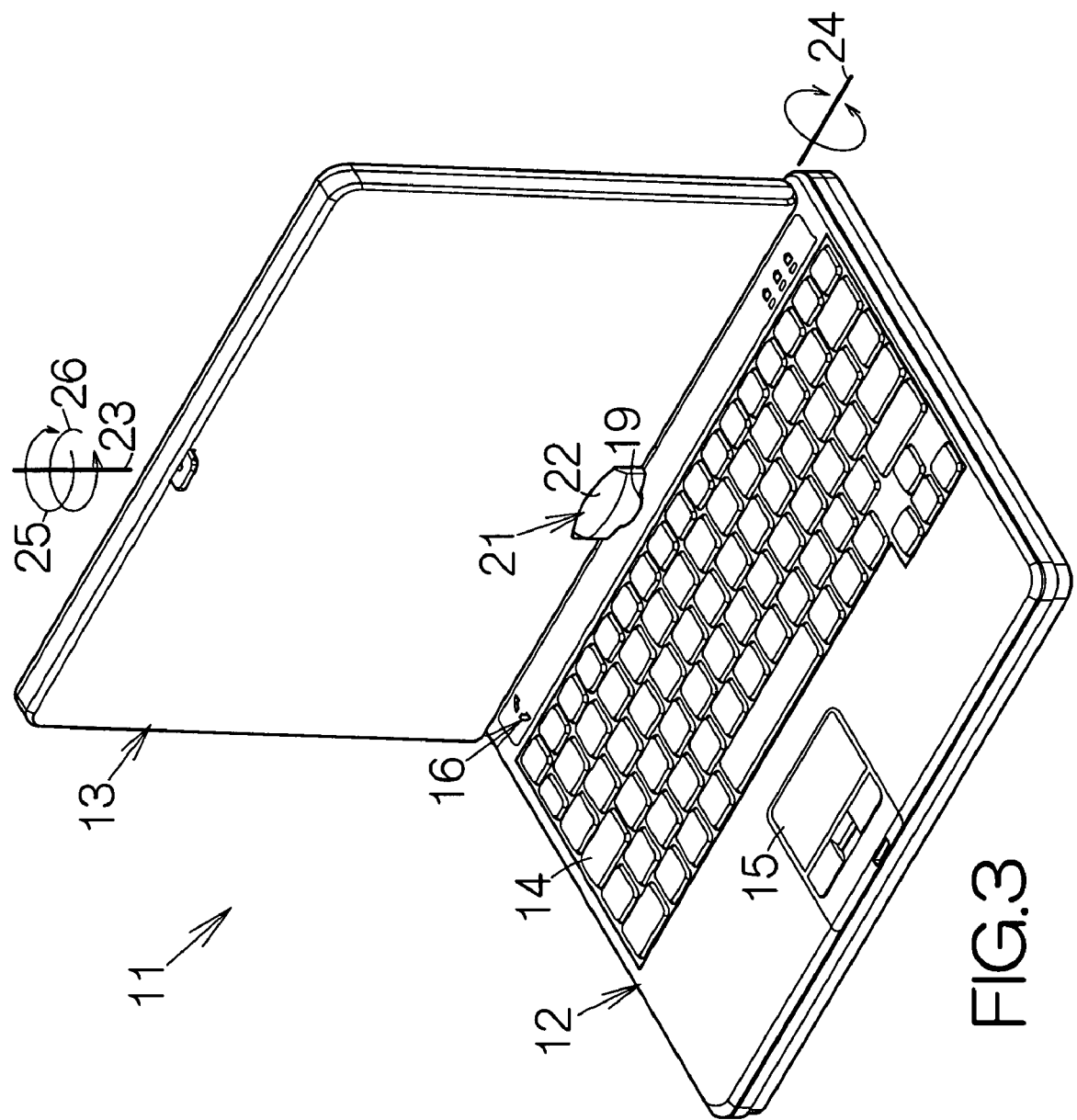
FIG. 3 is a perspective view schematically illustrating the notebook personal computer with the display enclosure rotated around a rotation axis.

As shown in FIG. 3, when the display enclosure 13 rotates in the first direction 25 from the reference attitude, the rotation of the display enclosure 13 is restricted at a first angle equal to 180 degrees from the reference attitude around the rotation axis 23. The display enclosure 13 thus takes a first angular attitude. The display enclosure 13 is completely reversed.

When the display enclosure 13 rotates in the second direction 26 from the reference attitude, the rotation of the display enclosure 13 is restricted at a second angle equal to 180 degrees from the reference attitude around the rotation axis 23. The display enclosure 13 thus takes a second angular attitude. The display enclosure 13 is completely reversed. Since both the first and second rotation angles are set at 180 degrees, the display enclosure 13 has the same appearance regardless of whether the display enclosure 13 takes the first or second angular attitude. The swivel mechanism 21 serves to prevent the display enclosure 13 to rotate over a limited rotation angle or 180 degrees in the first and second directions, respectively, as described later in detail. The swivel mechanism 21 also functions as a rotation restriction mechanism according to the present invention.

Figure 4:
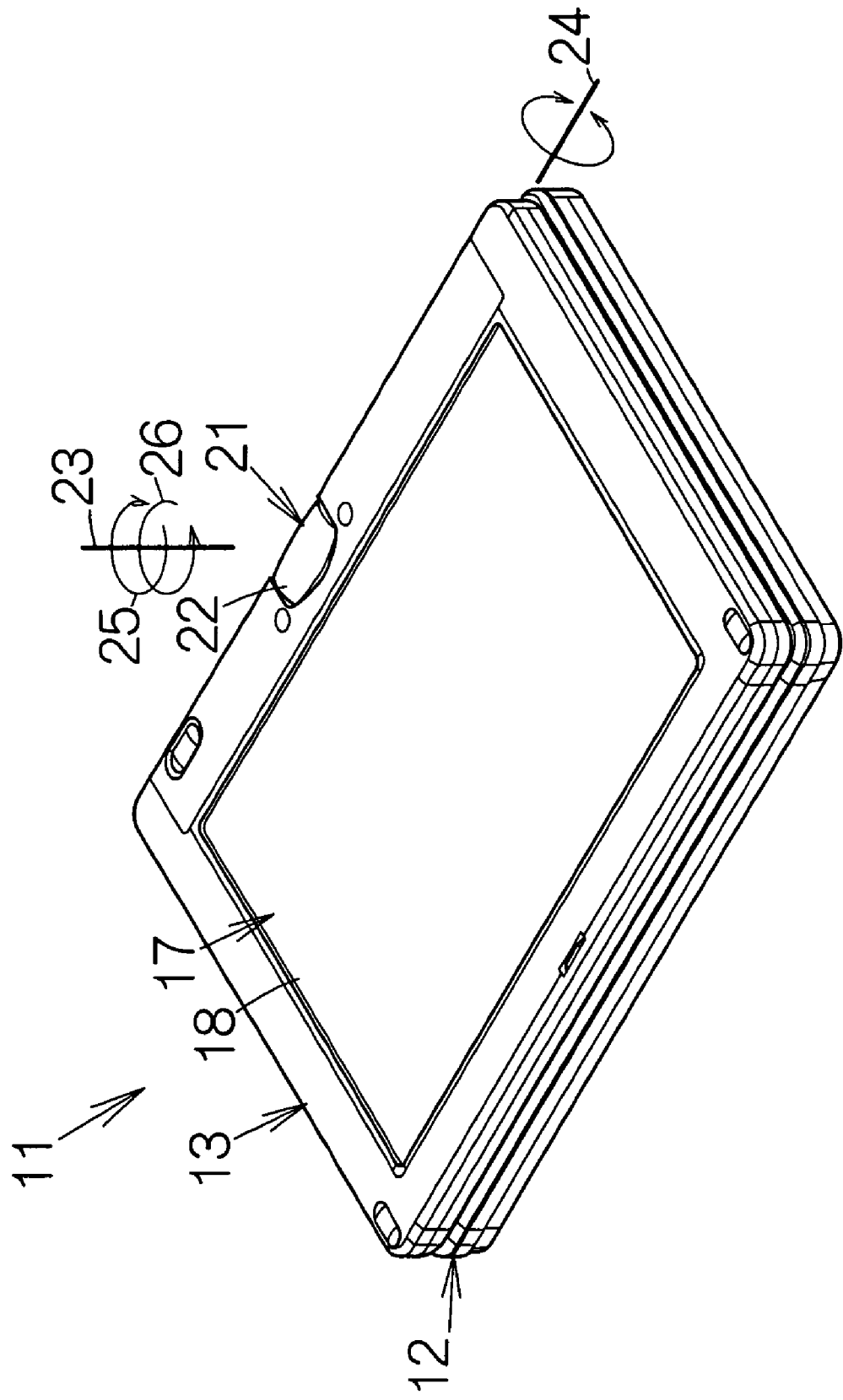
FIG. 4 is a perspective view schematically illustrating the notebook personal computer with the back surface of the display enclosure superposed on the front surface of the main enclosure.

When the display enclosure 13 takes either of the first and second angular attitudes, the display enclosure 13 can be superposed on the main enclosure 12 through the relative rotation around the horizontal axis 24, as shown in FIG. 4, for example. The back surface of the display enclosure 13 is opposed to the front surface of the main enclosure 12. The display enclosure 13 thus takes a second closed attitude. The notebook personal computer 11 is folded. Users are allowed to manipulate the touch screen panel 18 with a stylus, for example, so as to input various kinds of information.

Figure 5:
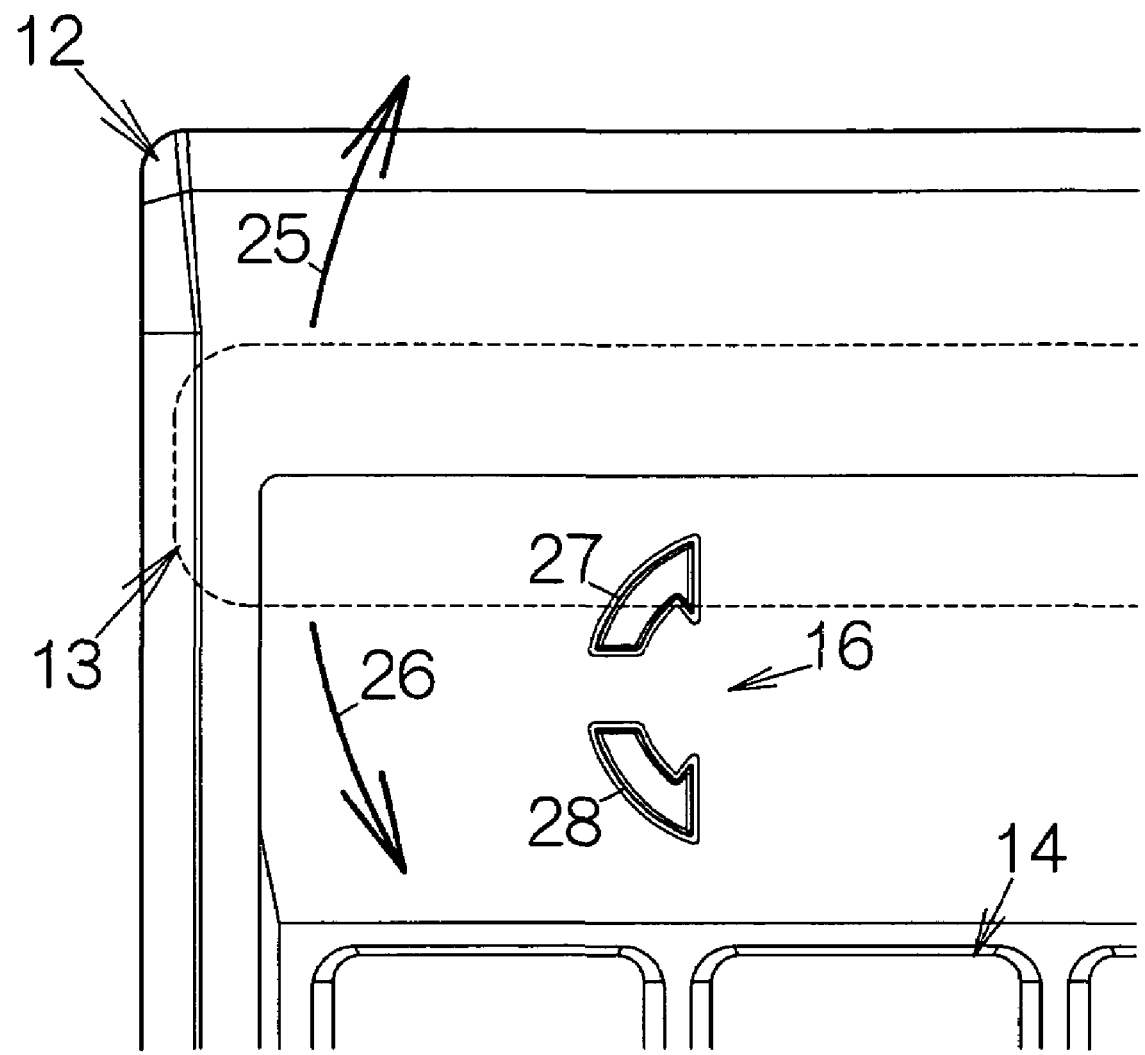
FIG. 5 is an enlarged partial plan view schematically illustrating a displaying unit.

As shown in FIG. 5, the displaying unit 16 includes a first pilot lamp 27 and a second pilot lamp 28. The first and second pilot lamps 27, 28 light up based on the emission of LEDs (Light-Emitting Diode). The first and second pilot lamps 27, 28 are formed in the shapes of arrows extending along an arc in the opposite directions, for example. The light of the first pilot lamp 27 serves to indicate the first direction 25. The light of the second pilot lamp 28 serves to indicate the second direction 26.

Figure 6:
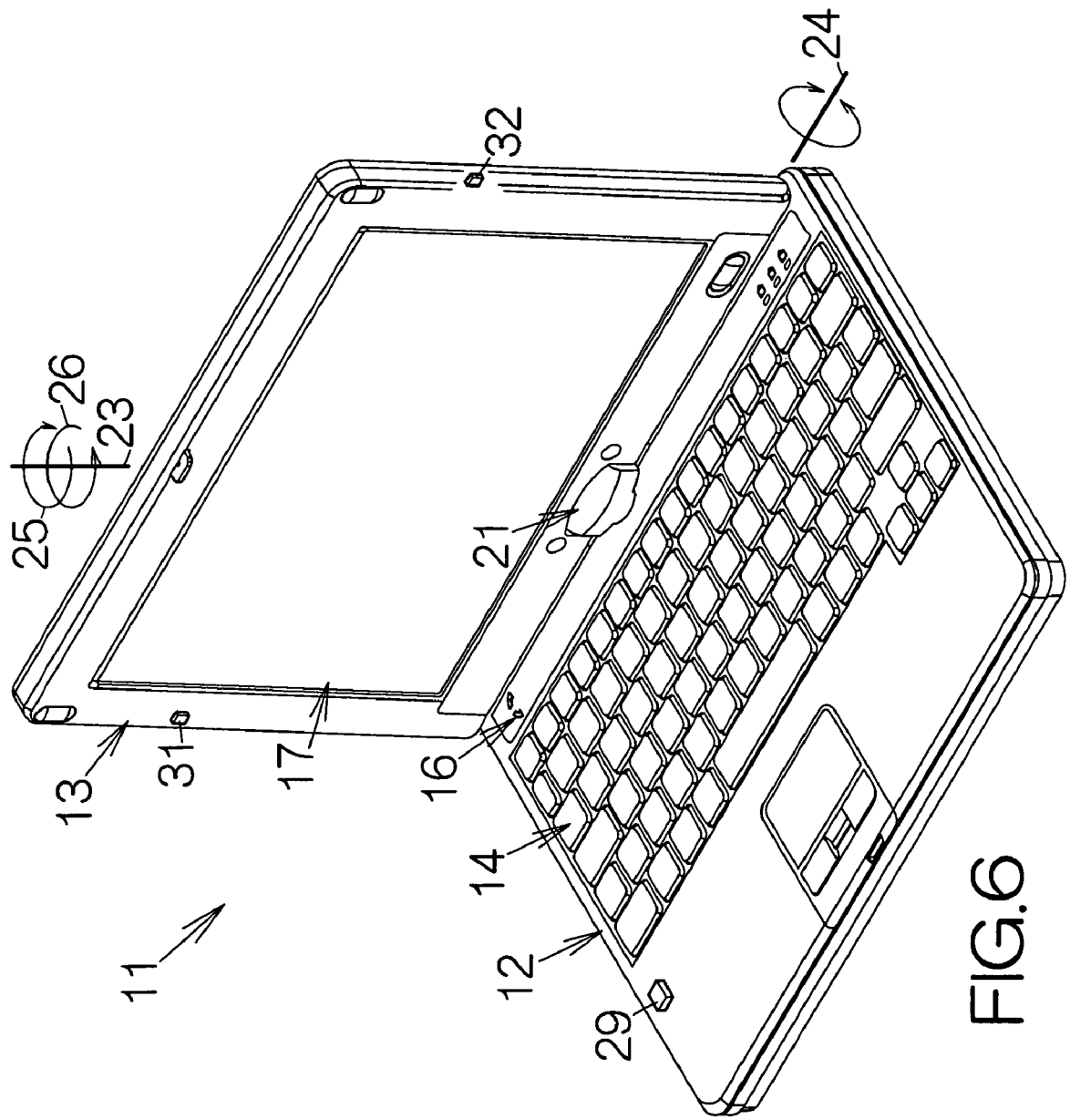
FIG. 6 is a partial phantom perspective view schematically illustrating a positional relationship between a magnetic sensor and magnets.

As shown in FIG. 6, a magnetic sensor 29 is enclosed in the main enclosure 12 at a position outside the keyboard 14. A pair of magnets 31, 32 are enclosed in the display enclosure 13 at positions outside the LCD panel 17. The magnet 31 is located along the front surface of the display enclosure 13 at a position near one of the short edges of the rectangular contour of the display enclosure 13. The magnet 32 is located along the back surface of the display enclosure 13 at a position near the other of the short edges of the rectangular contour of the display enclosure 13.

When the display enclosure 13 takes the first closed attitude, as shown in FIG. 2, a magnetic field acts on the magnetic sensor 29 from the magnet 31. When the display enclosure 13 takes the second closed attitude, as shown in FIG. 4, a magnetic field acts on the magnetic sensor 29 from the magnet 32. The magnetic sensor 29 is in this manner allowed to detect whether the display enclosure 13 takes the first or second closed attitude. The magnetic sensor 29 outputs a detection signal in response to the detection of the first or second closed attitude.

Figure 7:
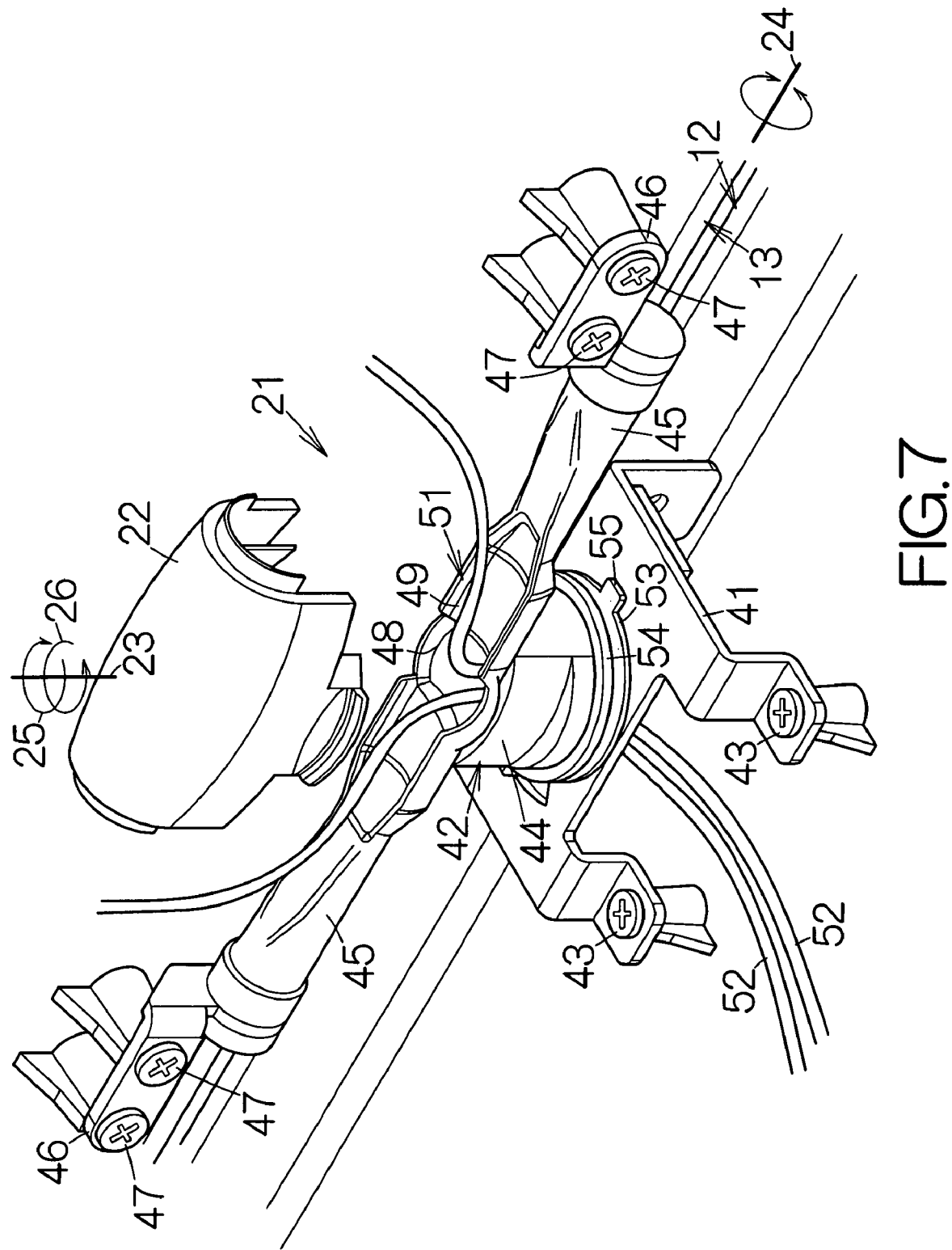
FIG. 7 is a partial exploded perspective view schematically illustrating a swivel mechanism.

As shown in FIG. 7, the swivel mechanism 21 includes a support member 41 incorporated in the main enclosure 12. The swivel mechanism 21 further includes a rotating member 42 supported on the support member 41 for relative rotation around the rotation axis 23. The support member 41 is fixed to the inner wall of the main enclosure 12, for example. Screws 43 may be utilized to fix the support member 41, for example. The individual screw 43 may be received in a boss standing upright from the inner wall of the main enclosure 12. The rotating member 42 is covered with the aforementioned hinge cap 22.

The rotating member 42 includes a cylindrical body 44 and a pair of arms 45, 45 extending in the opposite directions from the upper end of the cylindrical body 44. Rotating pieces 46, 46 are coupled to the free ends of the arms 45, 45 for relative rotation around the horizontal axis 24, respectively. The rotating pieces 46 are fixed to the inner wall of the display enclosure 13. Screws 47 are utilized to fix the rotating piece 46, for example. The individual screw 47 may be received in a boss standing upright from the inner wall of the display enclosure 13.

A through hole 48 is formed in the cylindrical body 44. The through hole 48 penetrates through the cylindrical body 44 along the rotation axis 23. A depression 49 is formed in the rotating member 42 at the upper end of the through hole 48. The depression 49 extends from one of the arms 45 to the other of the arms 45. A horizontal space 51 is formed in a space between the depression 49 and the hinge cap 22. The horizontal space 51 extends in the horizontal direction from the through hole 48 extending in the vertical direction. The horizontal space 51 is open in the inner space of the display enclosure 13 on the arms 45. The lower end of the through hole 48 is open in the inner space of the main enclosure 12. Wires 52 are located in the through hole 48 and the horizontal space 51. The wires 52 in this manner extend from the inner space of the main enclosure 12 to the inner space of the display enclosure 13.

When the rotating pieces 46 rotate relative to the arms 45 in the swivel mechanism 21, the display enclosure 13 rotates relative to the main enclosure 12 around the horizontal axis 24. When the rotating member 42, namely the rotating pieces 46 rotate relative to the support member 41 around the longitudinal axis of the cylindrical body 44, namely the rotation axis 23, the display enclosure 13 rotates relative to the main enclosure 12 around the rotation axis 23.

First and second annular rotating pieces 53, 54 are connected to the cylindrical body 44, for example. The first annular rotating piece 53 is fixed to the cylindrical body 44. The first annular rotating piece 53 is thus allowed to rotate around the rotation axis 23 along with the rotating member 42 and the display enclosure 13. The second annular rotating piece 54 is mounted on the rotating member 42 for relative rotation around the rotation axis 23. The second annular rotating piece 54 is thus allowed to rotate separately from the rotation member 42 and the first annular rotating piece 53.

Figure 8:
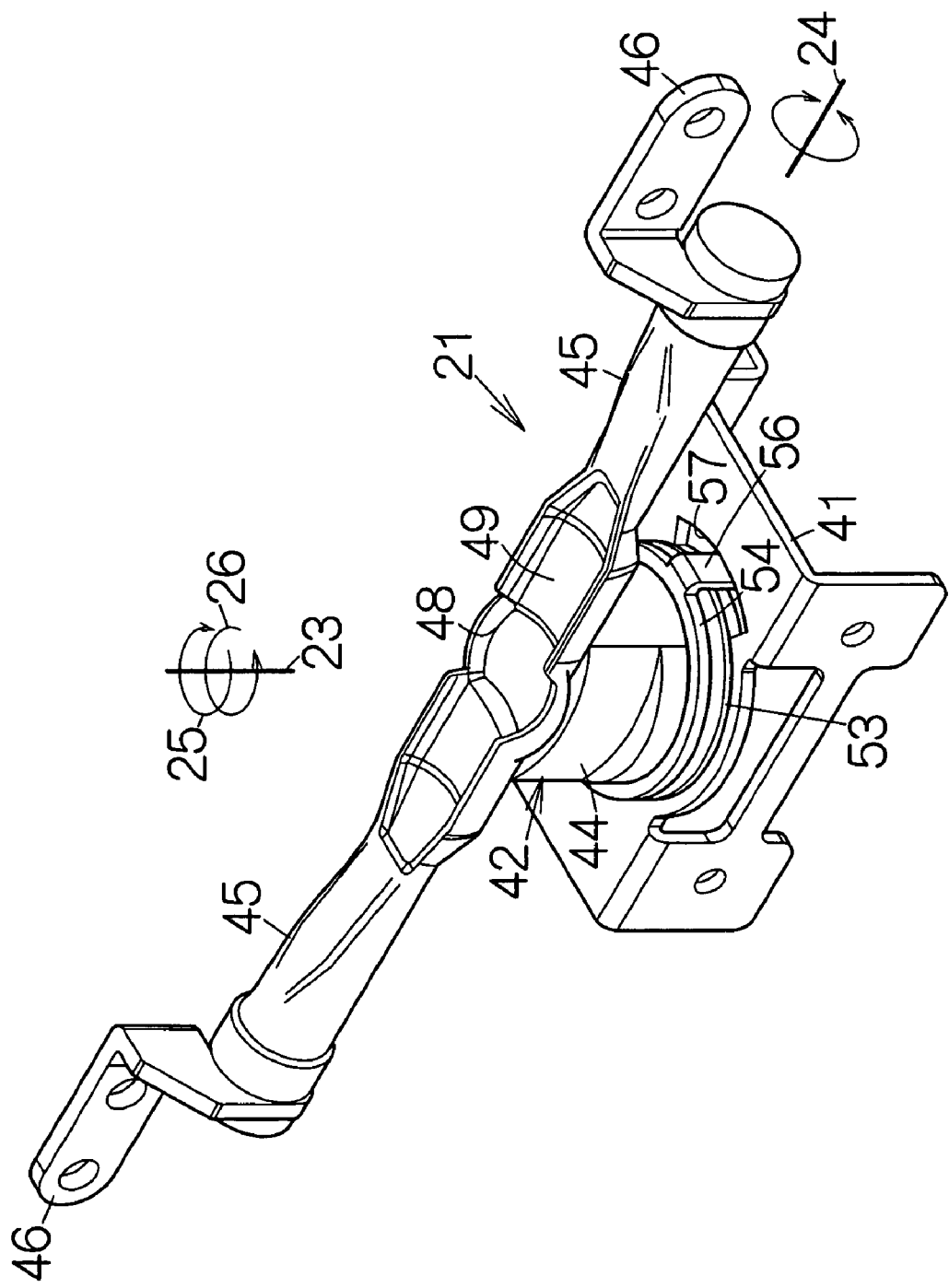
FIG. 8 is a perspective view schematically illustrating the structure of the swivel mechanism.

The first annular rotating piece 53 defines a protrusion 55 protruding outward in the radial direction. The protrusion 55 rotates around the rotation axis 23 on a circular orbit in response to the rotation of the rotating member 42. The second annular rotating piece 54 defines a restraining piece 56 protruding outward in the radial direction, as shown in FIG. 8. The restraining piece 56 bends in a direction perpendicular to the front surface of the support member 41. The restraining piece 56 thus extends to the support member 41 across the circular orbit of the protrusion 55. The protrusion 55 and the restraining piece 56 extend in the opposite directions from the cylindrical body 44.

An elongated opening 57 is formed in the support member 41. The elongated opening 57 extends along the circular orbit of the protrusion 55. The elongated opening 57 extends around the cylindrical body 44 over a predetermined length. The aforementioned restraining piece 56 is received in the elongated opening 57. The restraining piece 56 moves along the circular orbit between the opposite ends of the elongated opening 57.

Figure 9:
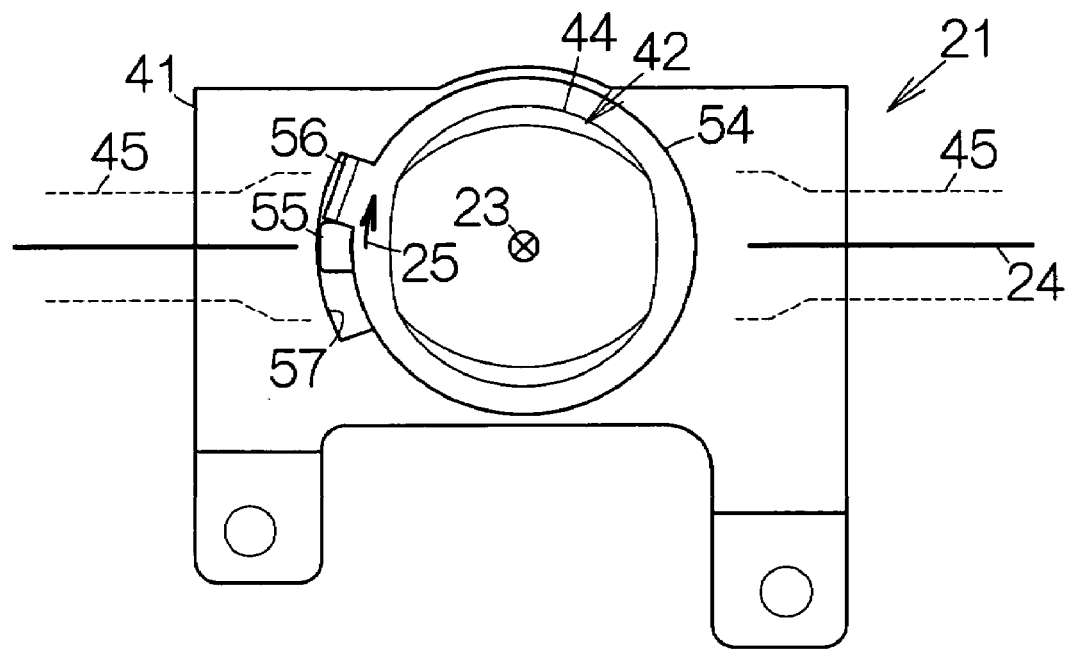
FIG. 9 is a cross-sectional view schematically illustrating the swivel mechanism when the display enclosure takes a first angular attitude.

When the display enclosure 13 rotates around the rotation axis 23 in the first direction 25 from the reference attitude, the protrusion 55 contacts with the restraining piece 56, as shown in FIG. 9. The restraining piece 56 thus rotates in the first direction 25. The restraining piece 56 moves within the elongated opening 57. When the display enclosure 13 rotates by a first rotation angle equal to 180 degrees, the restraining piece 56 contacts against one end of the elongated opening 57. The second annular rotating piece 54, the first annular rotating piece 53 and the rotating member 42 are thus prevented from rotating further in the first direction 25. This results in termination of the rotation of the display enclosure 13 in the first direction 25. The display enclosure 13 in this manner takes the first angular attitude.

Figure 10:
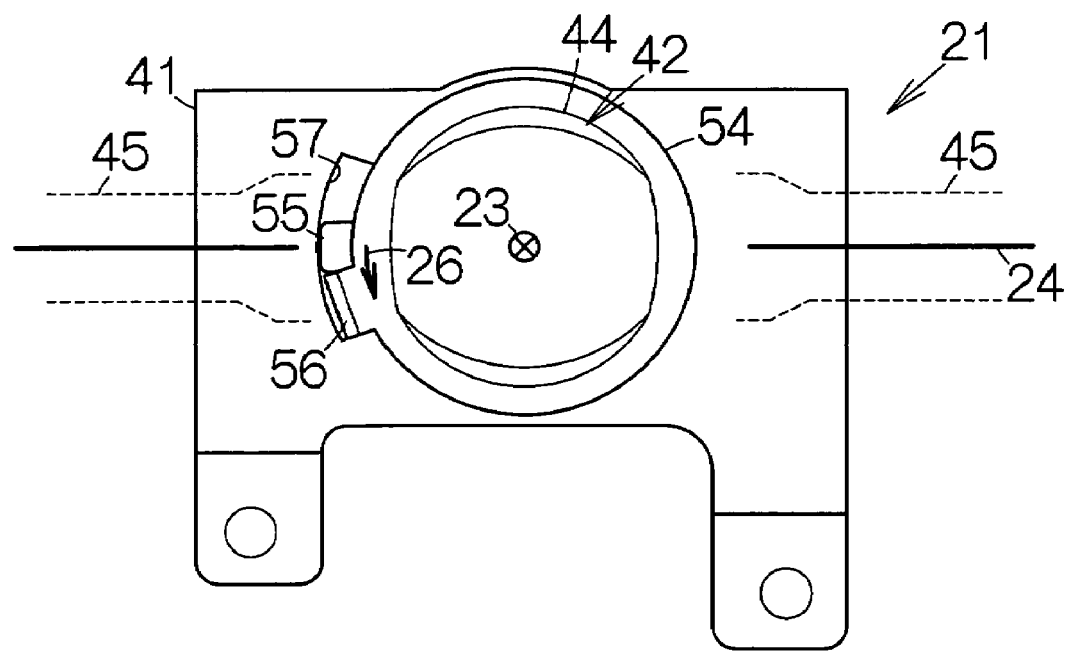
FIG. 10 is a cross-sectional view schematically illustrating the swivel mechanism when the display enclosure takes a second angular attitude.

When the display enclosure 13 rotates around the rotation axis 23 in the second direction 26 from the reference attitude, the protrusion 55 contacts with the restraining piece 56. As shown in FIG. 10, the restraining piece 56 rotates in the second direction 26. The restraining piece 56 moves within the elongated opening 57. When the rotating member 42 rotates by a second rotation angle equal to 180 degrees, the restraining piece 56 contacts against the other end of the elongated opening 57. The second annular rotating piece 54, the first annular rotating piece 53 and the rotating member 42 are thus prevented from rotating further in the second direction 26. This results in termination of the rotation of the display enclosure 13 in the second direction 26. The display enclosure 13 in this manner takes the second angular attitude.

Figure 11:
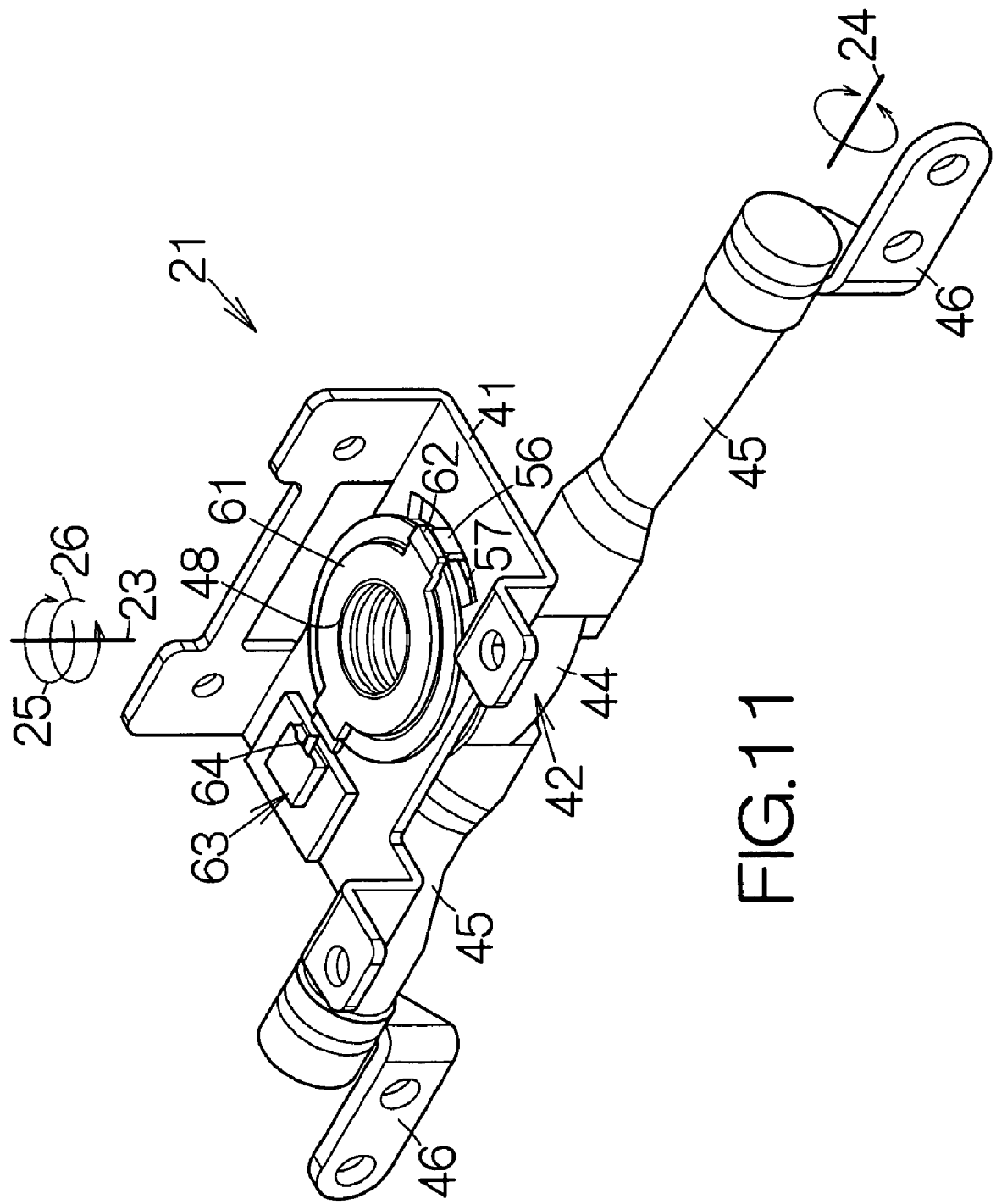
FIG. 11 is an enlarged perspective view of the swivel mechanism for schematically illustrating an operating element and a sensor.

As shown in FIG. 11, a third annular rotating piece 61 is located on the back surface of the support member 41. The third annular rotating piece 61 is integral with the cylindrical body 44. The third annular rotating piece 61 is thus allowed to rotate around the rotation axis 23 along with the rotating member 42, namely the display enclosure 13. The third annular rotating piece 61 defines an operating element 62 protruding outward in the radial direction. The operating element 62 moves around the rotation axis 23 on a circular orbit in response to the rotation of the third annular rotating piece 61.

Figure 12:
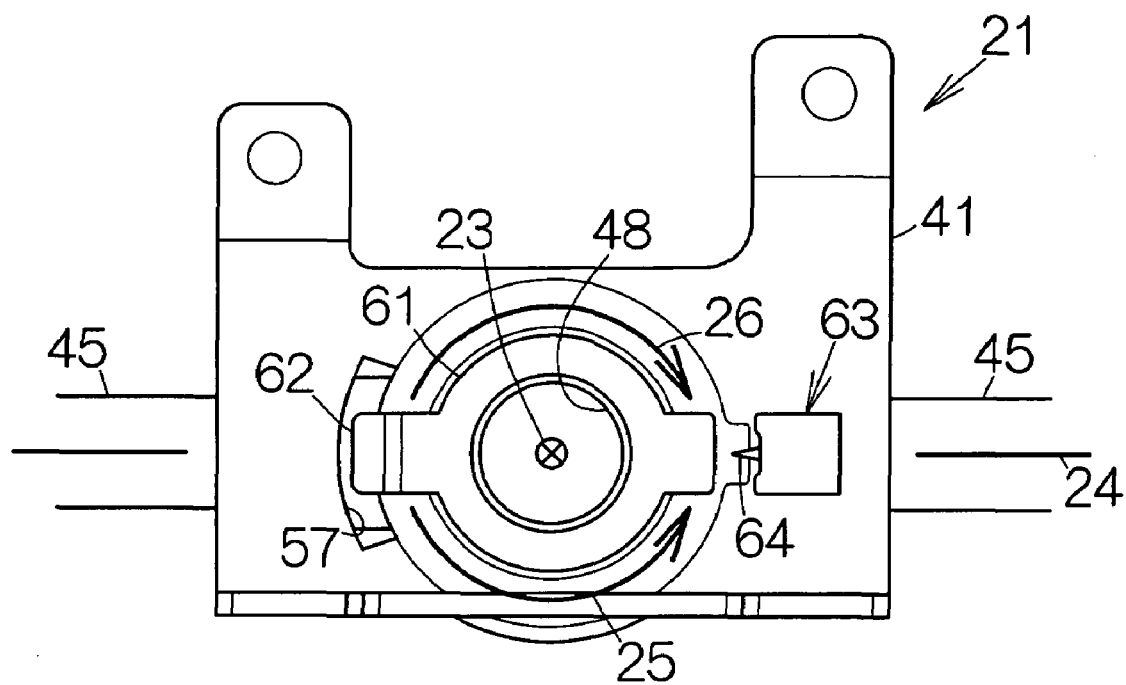
FIG. 12 is a bottom view of the swivel mechanism when the display enclosure takes a reference attitude.

A sensor 63 is attached to the back surface of the support member 41 for detecting contact of the operating element 62. Referring also to FIG. 12, when the display enclosure 13 takes the reference attitude, the operating element 62 and the sensor 63 are aligned on a straight line on the opposite sides of the rotation axis 23. The operating element 62 is allowed to move on the circular orbit in the first direction 25 and the second direction 26 in response to the rotation of the third annular rotating piece 61.

The sensor 63 includes a contact piece 64 staying on the circular orbit of the operating element 62. The contact piece 64 swings around a predetermined pivotal axis. The contact piece 64 swings around the pivotal axis in a normal direction and in a reverse direction opposite to the normal direction in response to contact with the operating element 62 as described later. The sensor 63 detects the direction of the movement of the operating element 62, namely the display enclosure 13, that is, the first direction 25 or the second direction 26 based on the swinging movement of the contact piece 64.

Figure 13:
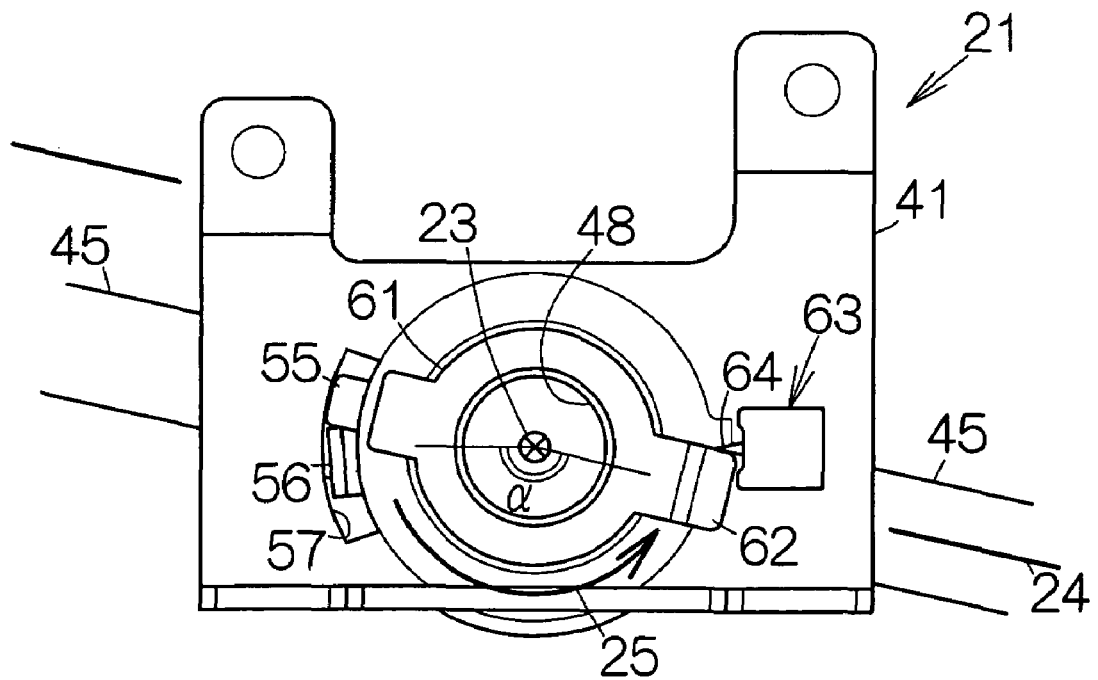
FIG. 13 is a bottom view of the swivel mechanism for schematically illustrating contact between the operating element and a contact piece.

Assume that the display enclosure 13 rotates around the rotation axis 23 in the first direction 25 from the reference attitude to the first angular attitude, for example. As shown in FIG. 13, when the display enclosure 13 rotates by a rotation angle α, the operating element 62 contacts with the contact piece 64 in the first direction 25. The operating element 62 drives the contact piece 64 so that the contact piece 64 swings in the normal direction from a normal attitude. The sensor 63 thus detects the rotation of the display enclosure 13 in the first direction 25. The sensor 63 outputs a predetermined rotation information signal. One of the directions 25, 26 of the rotation of the display enclosure 13 is specified in the rotation information signal.

Figure 14:
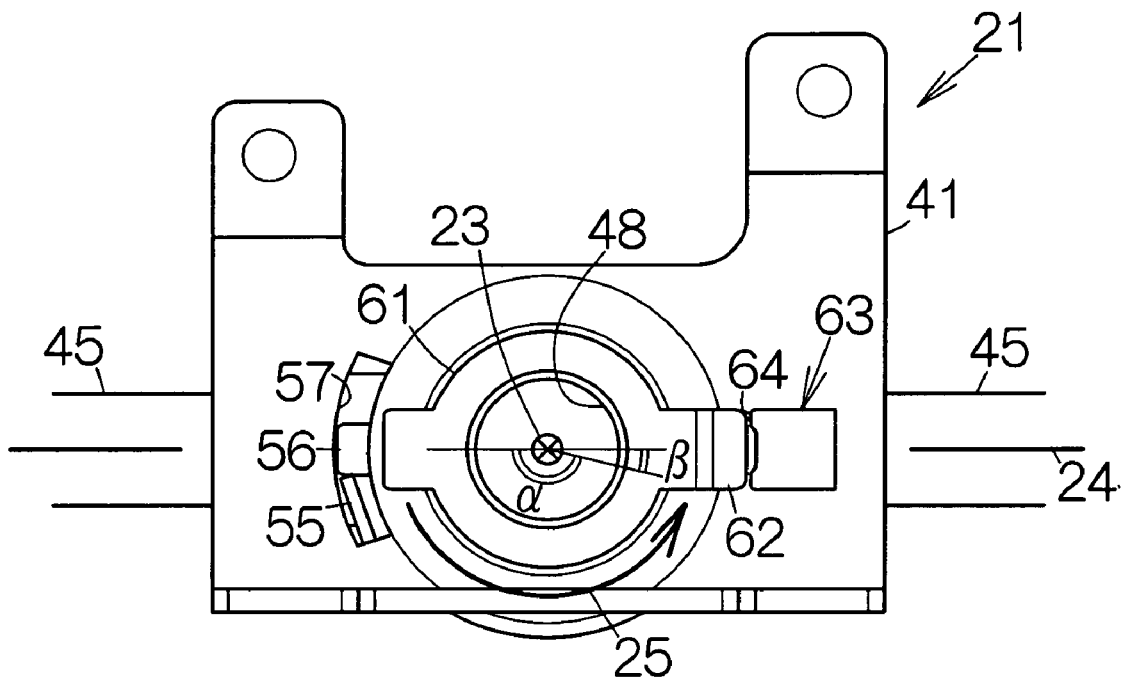
FIG. 14 is a bottom view of the swivel mechanism when the display enclosure takes the first angular attitude.

When the display enclosure 13 rotates from a position of the rotation angle α to a position of the first rotation angle equal to 180 degrees, the operating element 62 drives the contact piece 64 so that the contact piece 64 swings in the normal direction to the full extent, as shown in FIG. 14. The contact piece 64 is positioned at a first position equal to a predetermined swinging angle. The display enclosure 13 in this manner takes the first angular attitude. The sensor 63 detects the complete rotation of 180 degrees. The sensor 63 thus outputs the predetermined rotation information signal during the swinging movement of the contact piece 64 in the normal direction from the reference position.

Figure 15:
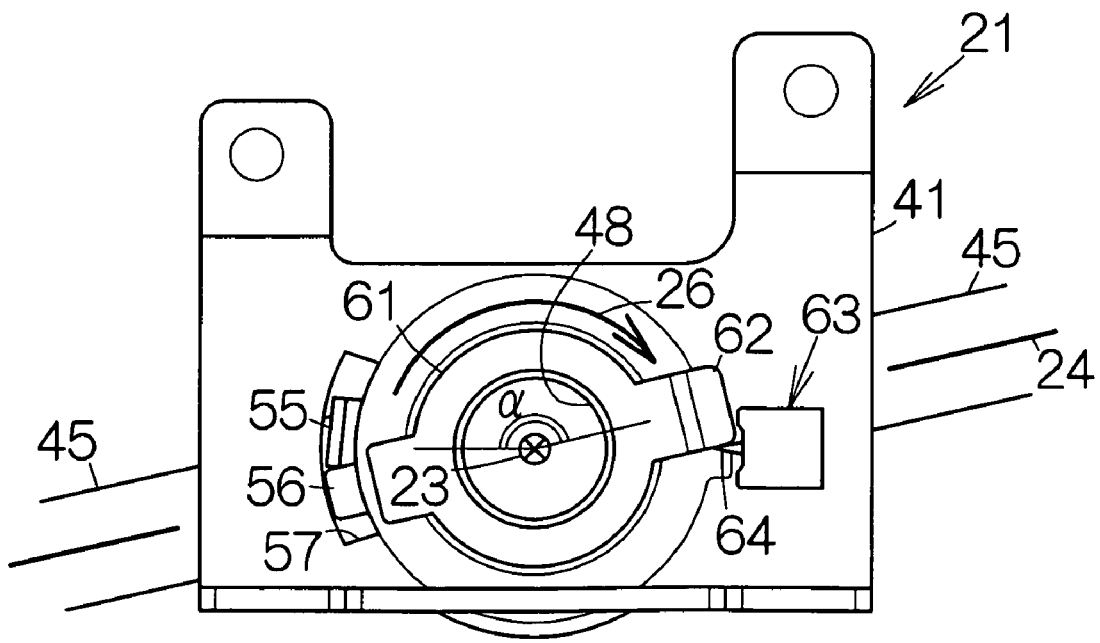
FIG. 15 is a bottom view of the swivel mechanism for schematically illustrating contact between the operating element and the contact piece.

Assume that the display enclosure 13 rotates around the rotation axis 23 in the second direction 26 from the reference attitude to the second angular attitude. As shown in FIG. 15, when the display enclosure 13 rotates by the aforementioned rotation angle α, the operating element 62 contacts with the contact piece 64 in the second direction. The operating element 63 drives the contact piece 64 so that the contact piece 64 swings in the reverse direction opposite to the normal direction from the reference position. The sensor 63 detects the rotation of the display enclosure 13 in the second direction 26. The sensor 63 outputs the predetermined rotation information signal.

Figure 16:
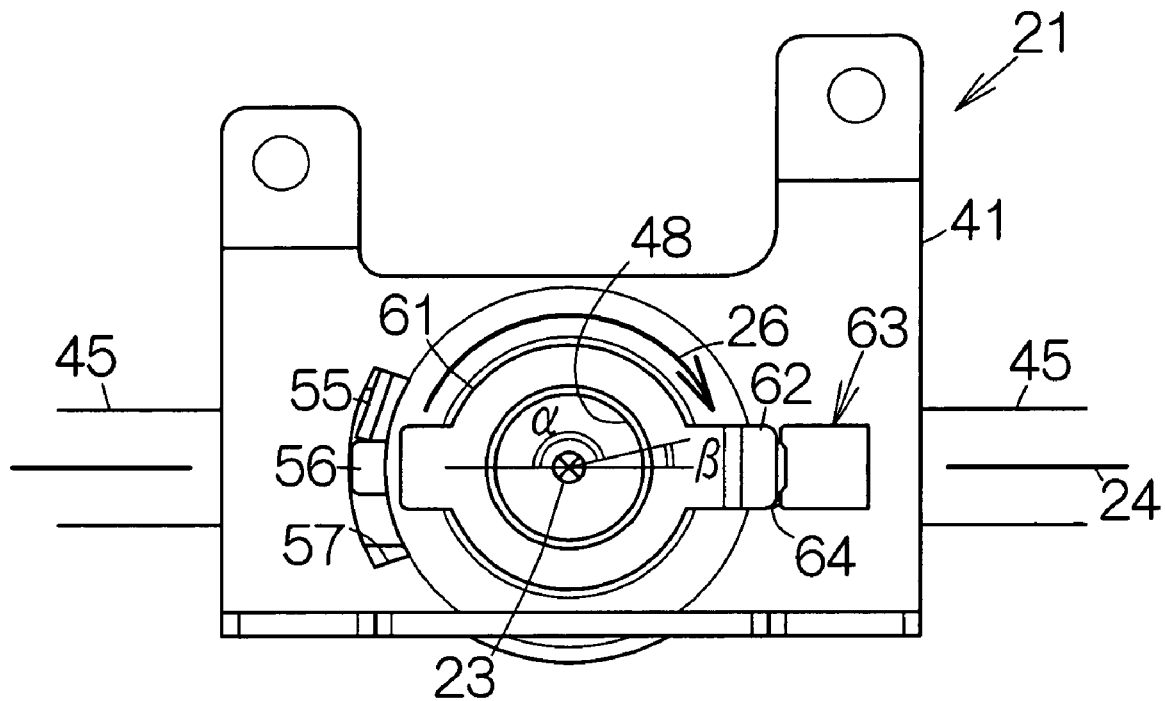
FIG. 16 is a bottom view of the swivel mechanism when the display enclosure 13 takes the second angular attitude.

When the display enclosure 13 rotates from a position of the rotation angle α to a position of the second rotation angle equal to 180 degrees, the operating element 62 drives the contact piece 64 so that the contact piece 64 swings in the reverse direction to the full extent, as shown in FIG. 16. The contact piece 64 is positioned at a second position equal to a predetermined swinging angle. The display enclosure 13 in this manner takes the second angular attitude. The sensor 63 detects the complete rotation of 180 degrees. The sensor 63 thus outputs the predetermined rotation information signal during the swinging movement of the contact piece 64 in the reverse direction from the reference position.

Here, the angle α is set at 180 degrees or smaller. A difference angle β is defined between the angle α and 180 degrees. Specifically, the contact piece 64 is kept in contact with the operating element 62 over a range of the difference angle β from the first or second angular attitude. The sensor 63 is thus allowed to output the rotation information signal while the sensor 63 detects the contact of the operating element 62 over a range of the difference angle β. Here, the rotation information signal maybe output only when the display enclosure 13 completely takes the first or second angular attitude.

Figure 17:
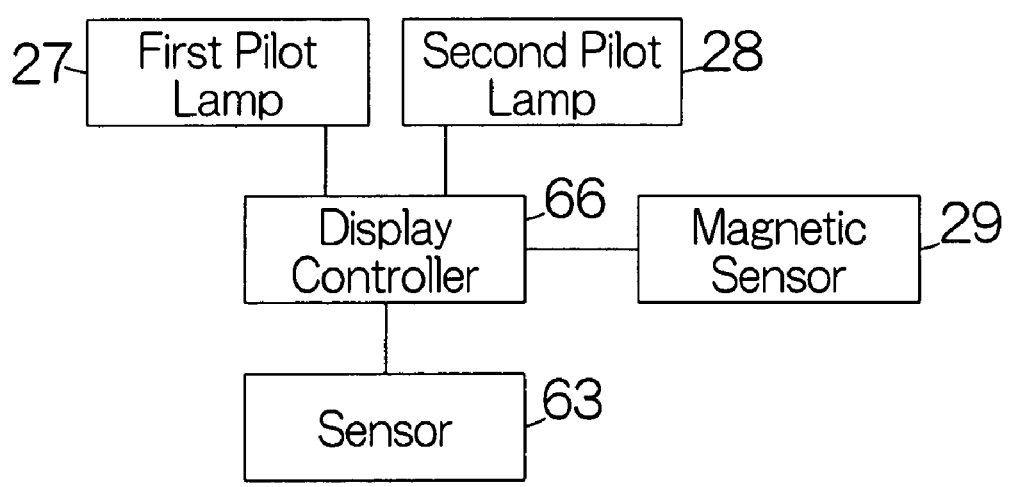
FIG. 17 is a block diagram illustrating a control system of the displaying unit.

As shown in FIG. 17, a display controller 66 is connected to the sensor 63, for example. The display controller 66 may be mounted on the printed wiring board of the motherboard, for example. When the display enclosure 13 takes either of the first and second angular attitudes, the sensor 63 outputs the predetermined rotation information signal to the display controller 66 in response to contact with the operating element 62 as described above.

In the case where the notebook personal computer 11 is turned off with the display enclosure 13 in either of the first and second angular attitudes, for example, the operating element 62 is kept in contact with the contact piece 64. Specifically, the contact piece 64 is positioned at the first or second position through rotation in the normal or reverse direction to the full extent. In the case where the notebook personal computer 11 is turned on with the contact piece 64 at the first or second position, for example, the sensor 63 is allowed to output the rotation information signal.

The display controller 66 is connected to the aforementioned first and second pilot lamps 27, 28. The display controller 66 supplies electric current to the LED of the first pilot lamp 27 or the second pilot lamp 28 depending on the rotation information signal. The first pilot lamp 27 or the second pilot lamp 28 lights up. The first direction 25 or the second direction 26 is thus shown to users.

Here, when the sensor 63 detects the rotation of the display enclosure 13 in the first direction 25, the display controller 66 operates so that the second pilot lamp 28 lights up. The second pilot lamp 28 indicates the rotation in the second direction 26. When the sensor 63 detects the rotation of the display enclosure 13 in the second direction 26, the display controller 66 operates so that the first pilot lamp 27 lights up. The first pilot lamp 27 indicates the rotation in the first direction. The rotation information signal is output only when the display enclosure 13 takes the first or second angular attitude as described above. The first and second pilot lamps 27, 28 thus light up only when the display enclosure 13 takes the first and second angular attitudes.

The aforementioned magnetic sensor 29 is connected to the display controller 66. The magnetic sensor 29 outputs the detection signal to the display controller 66 when the display enclosure 13 takes the first or second closed attitude. While the detection signal is output to the display controller 66, the display controller 66 operates so that the first and second pilot lamps 27, 28 are turned off. The first and second pilot lamps 27, 28 are prevented from lighting up when the display enclosure 13 takes either of the first and second closed attitudes. The first and second pilot lamps 27, 28 are in this manner prevented from a continuous operation.

In the notebook personal computer 11, when the display enclosure 13 takes the first angular attitude through the rotation in the first direction 25, the second pilot lamp 28 lights up. The user can thus recognize that it is necessary to rotate the display enclosure 13 in the second direction 26 so that the display enclosure 13 returns to the reference attitude. When the display enclosure 13 takes the second angular attitude through the rotation in the second direction 26, the first pilot lamp 27 lights up. The user can thus recognize that it is necessary to rotate the display enclosure 13 in the first direction 25 so that the display enclosure 13 returns to the reference attitude. When the display enclosure 13 takes the first or second angular attitude, the user can easily recognize the acceptable direction for the rotation of the display enclosure 13, that is, the first direction 25 or the second direction 26. This results in a reliable prevention of destruction of the swivel mechanism 21.

The notebook personal computer 11 may allow the first pilot lamp 27 to light up when the display enclosure 13 takes the first angular attitude. In this case, the second pilot lamp 28 may light up when the display enclosure 13 takes the second angular attitude. The first or second direction 25, 26 for the rotation of the display enclosure 13 may be shown in this manner. The user can recognize that it is necessary to rotate the display enclosure 13 in the direction opposite to the first or second direction 25, 26, as indicated by the first or second pilot lamp 27, 28, so that the display enclosure 13 returns to the reference attitude. When the display enclosure 13 takes the first or second angular attitude, the user can easily recognize the acceptable direction for the rotation of the display enclosure 13, that is, the first direction 25 or the second direction 26.

Figure 18:
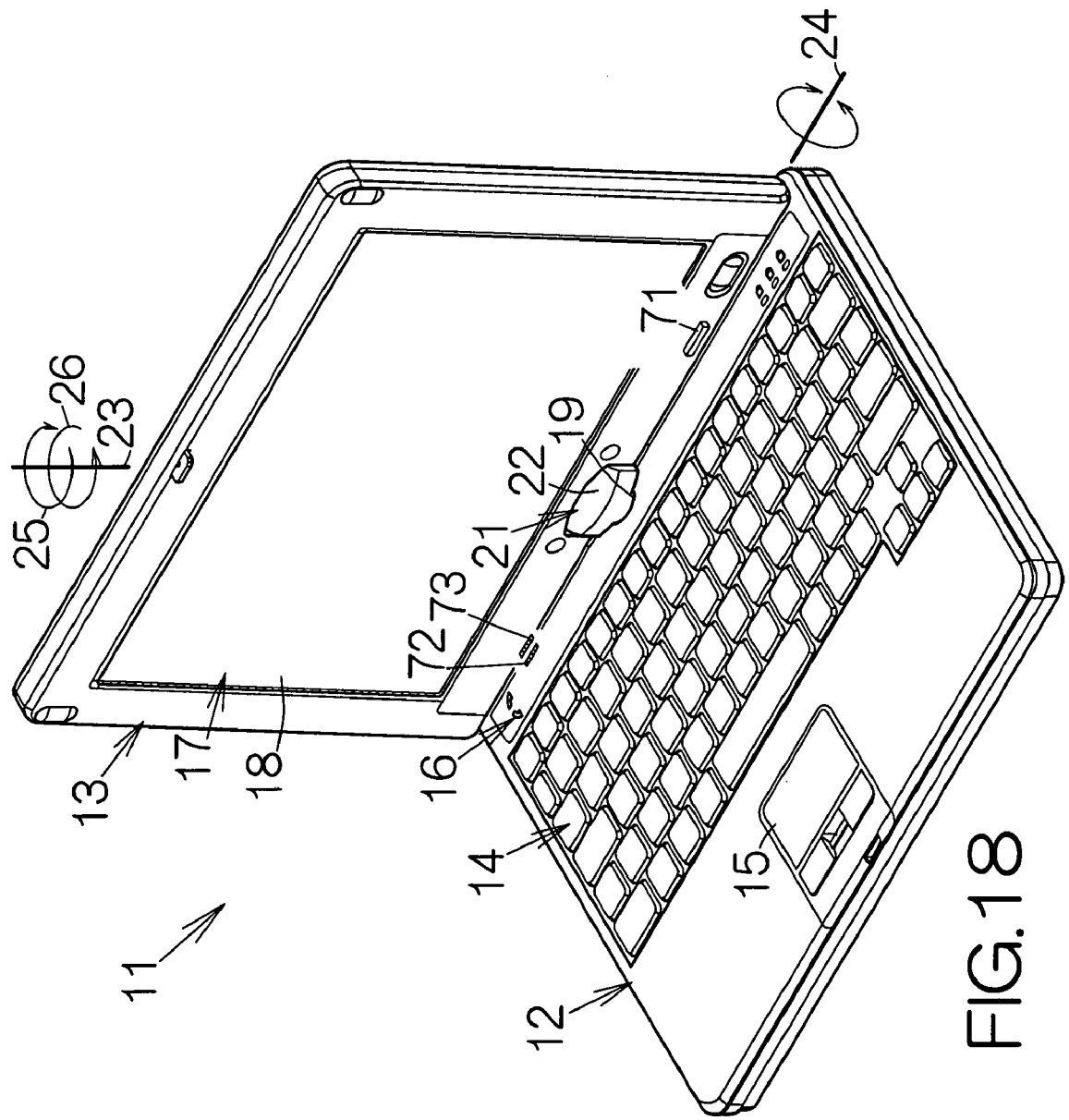
FIG. 18 is a perspective view schematically illustrating a notebook personal computer according to another example.

As shown in FIG. 18, a magnet 71 and first and second magnetic sensors 72, 73 may be incorporated in the notebook personal computer 11 in place of the operating element 62 and the sensor 63. The magnet 71 may be incorporated in the display enclosure 13. A permanent magnet may be employed as the magnet 71, for example. The magnet 71 generates a magnetic field acting over a predetermined range. The first and second magnetic sensors 72, 73 are incorporated in the main enclosure 12. The first and second magnetic sensors 72, 73 are capable of detecting a magnetic field.

Figure 19:
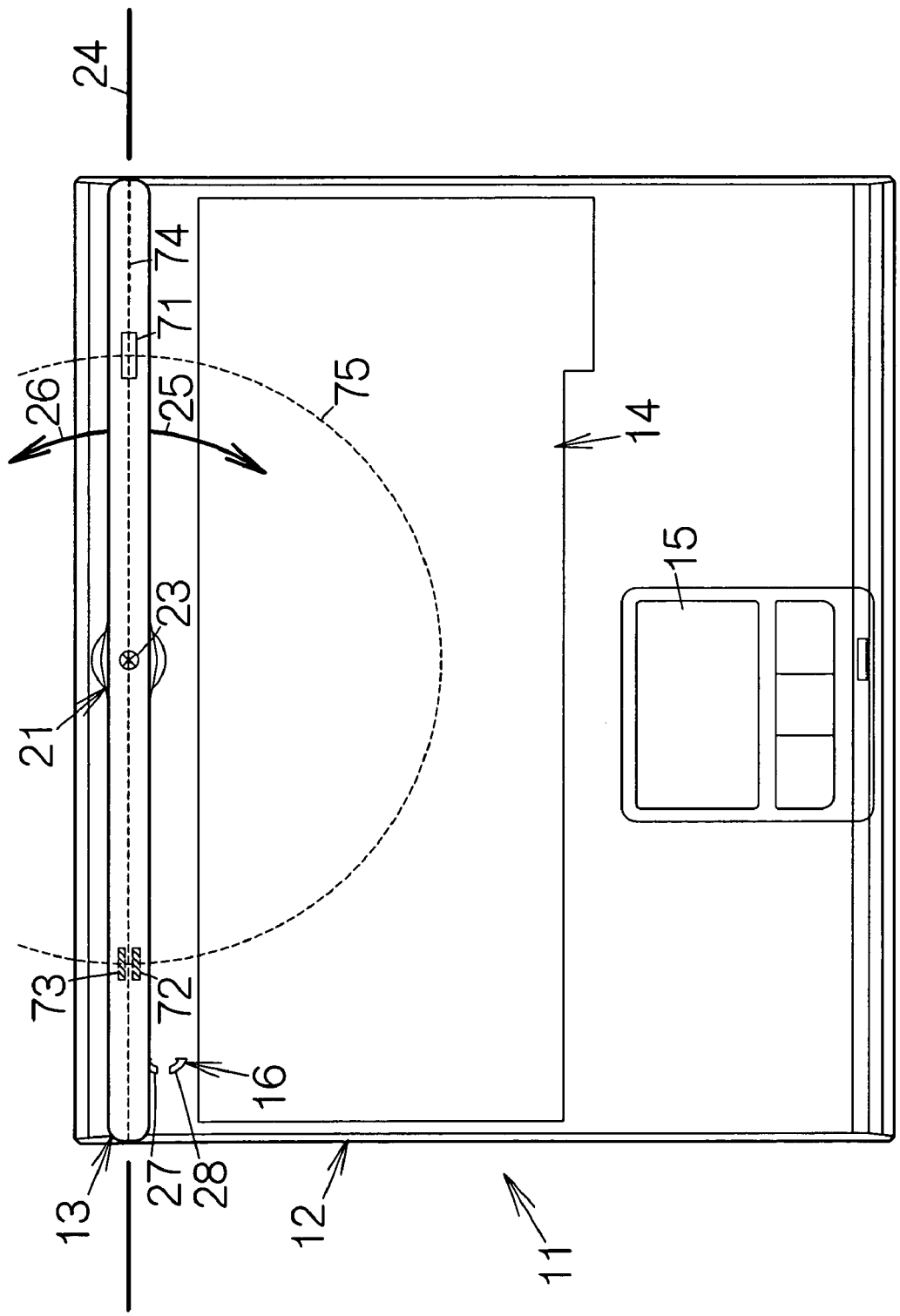
FIG. 19 is a plan view of the notebook personal computer for schematically illustrating a positional relationship between a magnet and first and second magnet sensors when the display enclosure takes the reference attitude.

Referring also to FIG. 19, the magnet 71 may be located within the display enclosure 13 near the horizontal axis 24, for example. The first and second magnetic sensors 72, 73 are located symmetrical relative to an imaginary line 74 corresponding to a projection of the horizontal axis 24 on the front surface of the display enclosure 13 taking the reference attitude. The length of a perpendicular established from the magnet 71 to the rotation axis 23 may correspond to that established from the individual magnetic sensor 72, 73 to the rotation axis 23.

Figure 20:
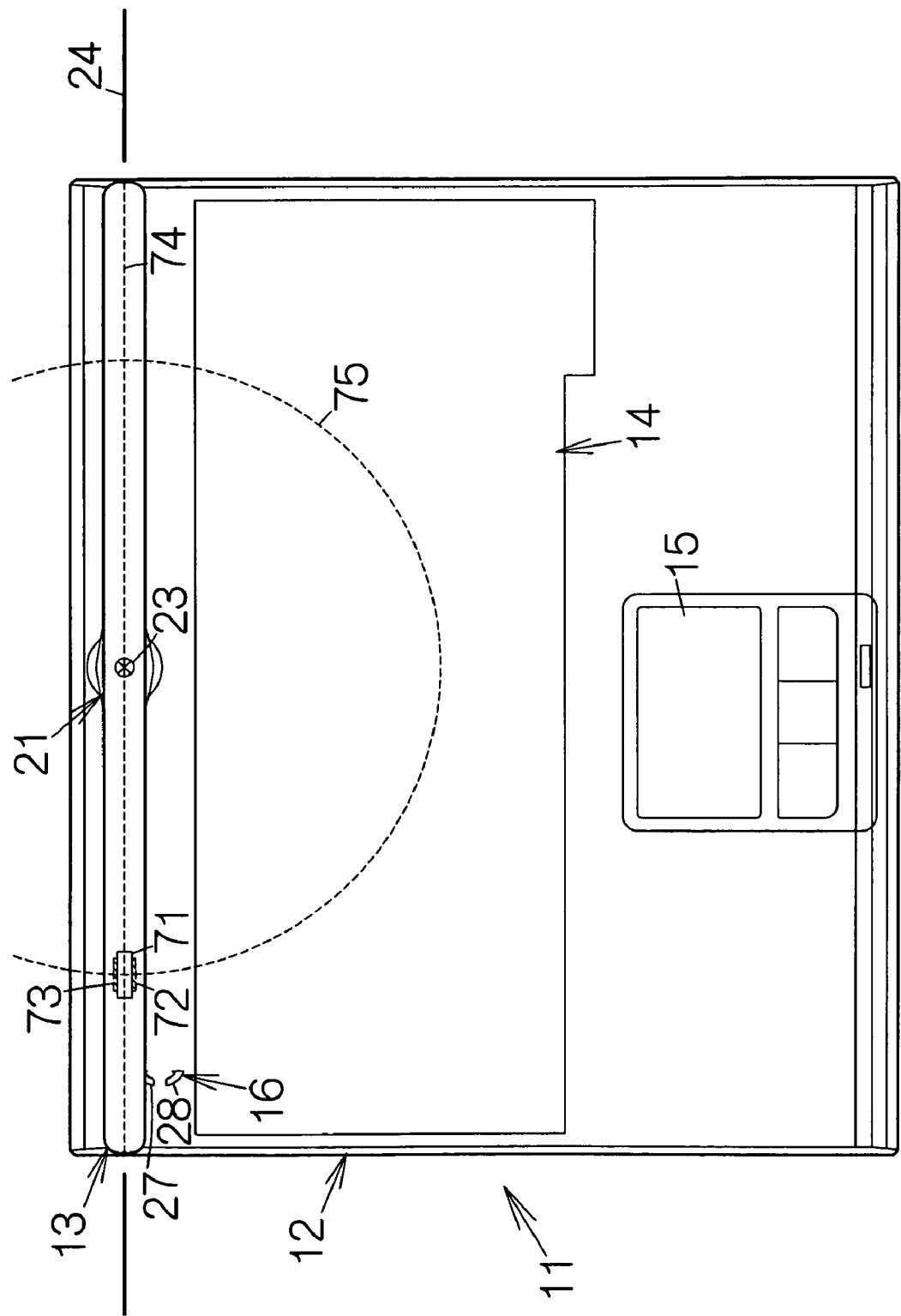
FIG. 20 is a plan view of the notebook personal computer when the display enclosure takes either of the first and second angular attitudes.

The magnet 71 moves around the rotation axis 23 in the first direction 25 and the second direction 25 along with the display enclosure 13 in response to the rotation of the display enclosure 13 in the first direction 25 and the second direction from the reference attitude. The movement of the magnet 71 defines a movement path 75 of the magnet 71. The first and second magnetic sensors 72, 73 are located near the movement path 75 at a predetermined interval. When the display enclosure 13 takes either of the first and second angular attitudes, the magnet 71 is positioned between the first and second magnetic sensors 72, 73, as shown in FIG. 20. The magnet 71 generates a magnetic field equally acting on the first and second sensors 72, 73.

The first and second magnetic sensors 72, 73 are connected to the aforementioned display controller 66. The first and second magnetic sensors 72, 73 serve to detect the direction of the rotation of the display enclosure 13 based on the magnetic field acting from the magnet 71 when the magnet 71 moves around the rotation axis 23, as described later in detail. The first and second magnetic sensors 72, 73 in cooperation are designed to supply rotation information signals to the display controller 66. The rotation information signal specifies information on the direction, either of the first and second directions 25, 26, of the rotation of the display enclosure 13.

Figure 21:
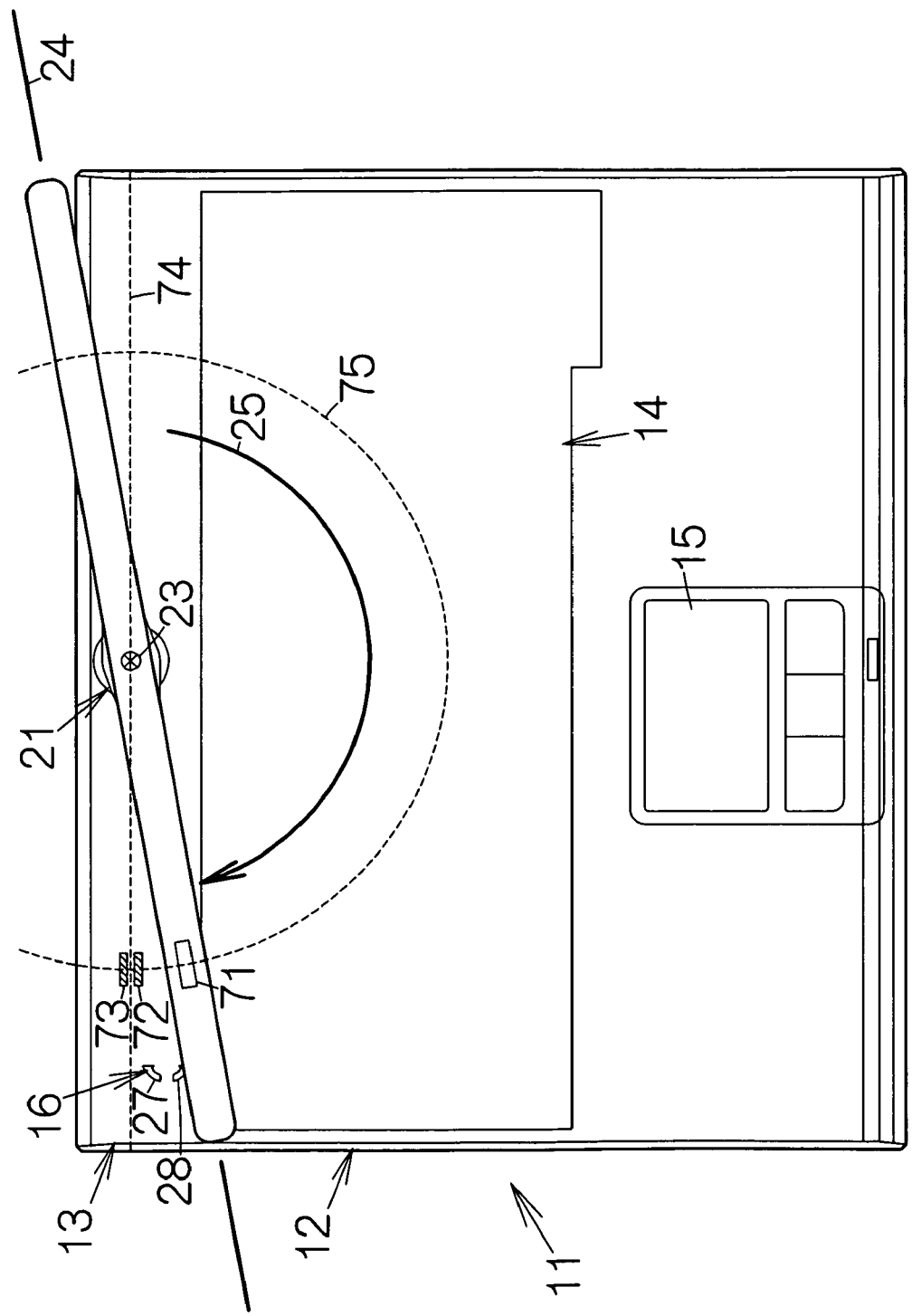
FIG. 21 is a plan view of the notebook personal computer when the display enclosure rotates to establish the first angular attitude.

Now, assume that the display enclosure 13 rotates from the reference attitude to the first angular attitude. As shown in FIG. 21, when the display enclosure 13 rotates around the rotation axis 23 in the first direction 25, the magnet 71 moves along the movement path 75. The first and second magnetic sensors 72, 73 thus sequentially detect the magnetic field of the magnet 71. Since the first magnetic sensor 72 detects the magnetic field earlier than the second magnetic sensor 73, the rotation in the first direction 25 is detected.

When the display enclosure 13 reaches the first rotation angle equal to 180 degrees, the display enclosure 13 takes the first angular attitude. The magnet 71 is positioned between the first and second magnetic sensors 72, 73. The magnetic field of the magnet 71 equally acts on the first and second magnetic sensors 72, 73. In this case, a rotation information signal is output to the display controller 66 from the first magnetic sensor 72. The rotation information signal specifies the first direction 25.

The display controller 66 operates based on the supplied rotation information signal so that the second pilot lamp 28 lights up. The second pilot lamp 28 thus indicates the second direction 26. The user can thus recognize that it is necessary to rotate the display enclosure 13 in the second direction 26 from the first angular attitude so that the display enclosure 13 returns to the reference attitude.

Figure 22:
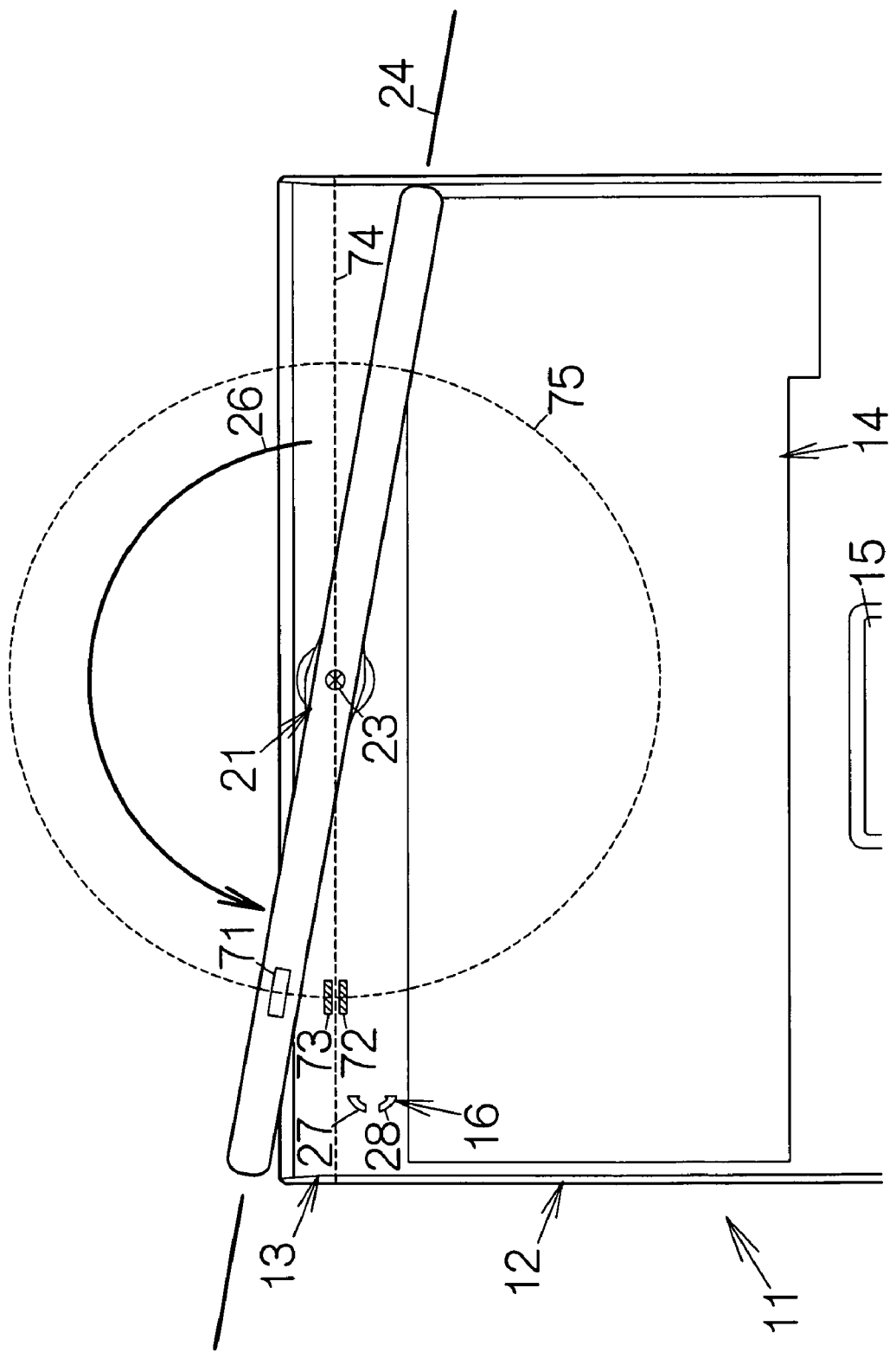
FIG. 22 is a plan view of the notebook personal computer when the display enclosure rotates to establish the second angular attitude.

Next, assume that the display enclosure 13 rotates from the reference attitude to the second angular attitude. As shown in FIG. 22, when the display enclosure 13 rotates around the rotation axis 23 in the second direction 26, the magnet 71 moves along the movement path 75. The second and first magnetic sensors 73, 72 thus sequentially detect the magnetic field of the magnet 71. Since the second magnetic sensor 73 detects the magnetic field earlier than the first magnetic sensor 72, the rotation in the second direction 26 is detected.

When the display enclosure 13 reaches the second rotation angle equal to 180 degrees, the display enclosure 13 takes the second angular attitude. The magnet 71 is positioned between the first and second magnetic sensors 72, 73 in the same manner as described above. The magnetic field of the magnet 71 equally acts on the first and second magnetic sensors 72, 73. A rotation information signal is output to the display controller 66 from the second magnetic sensor 73. The rotation information signal specifies the second direction 26.

The display controller 66 operates based on the supplied rotation information signal so that the first pilot lamp 27 lights up. The first pilot lamp 27 indicates the first direction 25. The user can thus recognize that it is necessary to rotate the display enclosure 13 in the first direction 25 from the second angular attitude so that the display enclosure 13 returns to the reference attitude.

It should be noted that the electronic apparatus according to the present invention can be an electronic apparatus other than the aforementioned notebook personal computer 11, such as a personal digital assistant (PDA) or a mobile phone terminal, for example.

What is claimed is:

1. An electronic apparatus comprising:
    a first enclosure;
    a second enclosure coupled to the first enclosure for relative rotation around a rotation axis intersecting with a surface of the first enclosure, the second enclosure rotating around the rotation axis in a first direction and a second direction, opposite to the first direction, from a reference attitude;
    a rotation restriction mechanism configured to terminate rotation of the second enclosure in the first direction from the reference attitude at a first rotation angle equal to at least 180 degrees from the reference attitude, thereby establishing a first attitude of the second enclosure, the rotation restriction mechanism being configured to terminate the rotation of the second enclosure in the second direction from the reference attitude at a second rotation angle equal to at least 180 degrees from the reference attitude, thereby establishing a second attitude of the second enclosure;
    an element configured to rotate around the rotation axis along with the second enclosure;
    a sensor configured to output a first signal in response to detection of action of the element in the first direction and a second signal in response to detection of action of the element in the second direction; and
    a displaying unit configured to indicate one of the first direction and the second direction in response to the first signal when the second enclosure takes the first attitude, the displaying unit configured to indicate another of the first direction and the second direction in response to the second signal when the second enclosure takes the second attitude.

2. The electronic apparatus according to claim 1, wherein the first rotation angle is set equal to the second rotation angle.

3. The electronic apparatus according to claim 2, wherein the first rotation angle and the second rotation angle are set at 180 degrees.

4. The electronic apparatus according to claim 1, wherein the second enclosure is coupled to the first enclosure for relative rotation around a horizontal axis set parallel to the surface of the first enclosure.

5. The electronic apparatus according to claim 1, wherein the sensor includes a contact piece disposed on a circular orbit of the element when the contact piece takes a normal attitude, the contact piece being configured to swing in a normal direction through a contact of the element resulting from a rotation of the second enclosure in the first direction, the contact piece being configured to swing in a reverse direction opposite to the normal direction through a contact of the element resulting from a rotation of the second enclosure in the second direction.

6. The electronic apparatus according to claim 5, wherein the contact piece starts swinging in the normal direction at a predetermined angle smaller than the first rotation angle.

7. The electronic apparatus according to claim 5, wherein the contact piece starts swinging in the reverse direction at a predetermined angle smaller than the second rotation angle.

8. The electronic apparatus according to claim 1, wherein:
    the element is a magnet rotating around the rotation axis along with the second enclosure; and
    the sensor including first and second magnetic sensors incorporated in the first enclosure, the first and second magnetic sensors arranged along a movement path of the magnet at a predetermined interval.

* * * * *

UNITED STATES PATENT AND TRADEMARK OFFICE
CERTIFICATE OF CORRECTION

PATENT NO. : 7,663,874 B2 Page 1 of 1
APPLICATION NO. : 12/230941
DATED : February 16, 2010
INVENTOR(S) : Masahiko Hattori et al.

It is certified that error appears in the above-identified patent and that said Letters Patent is hereby corrected as shown below:

Title Page
Item "(65) Prior Publication Data

US 2009/0009950 A1    Jan. 8, 2009" insert
--Related U.S. Application Data
(60) Continuation of application No. PCT/JP2006/304494, filed March 8, 2006.--.

Signed and Sealed this

Eleventh Day of May, 2010

David J. Kappos
*Director of the United States Patent and Trademark Office*